Oct. 28, 1952        H. P. LUHN        2,615,626

RECORD FEEDING AND ANALYZING APPARATUS

Filed May 20, 1950        21 Sheets—Sheet 1

INVENTOR
HANS P. LUHN
BY *Charles P. Boberg*
ATTORNEY

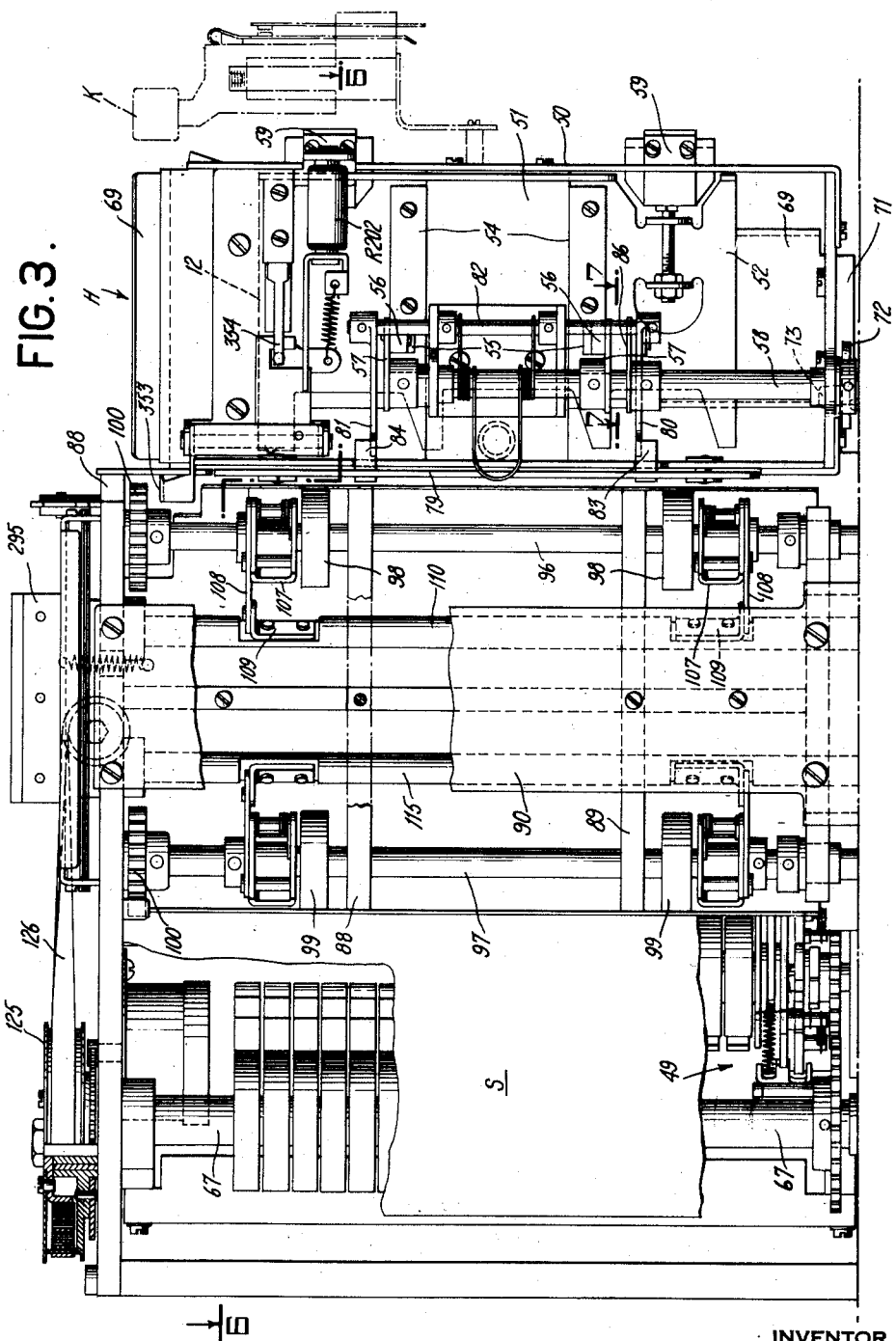

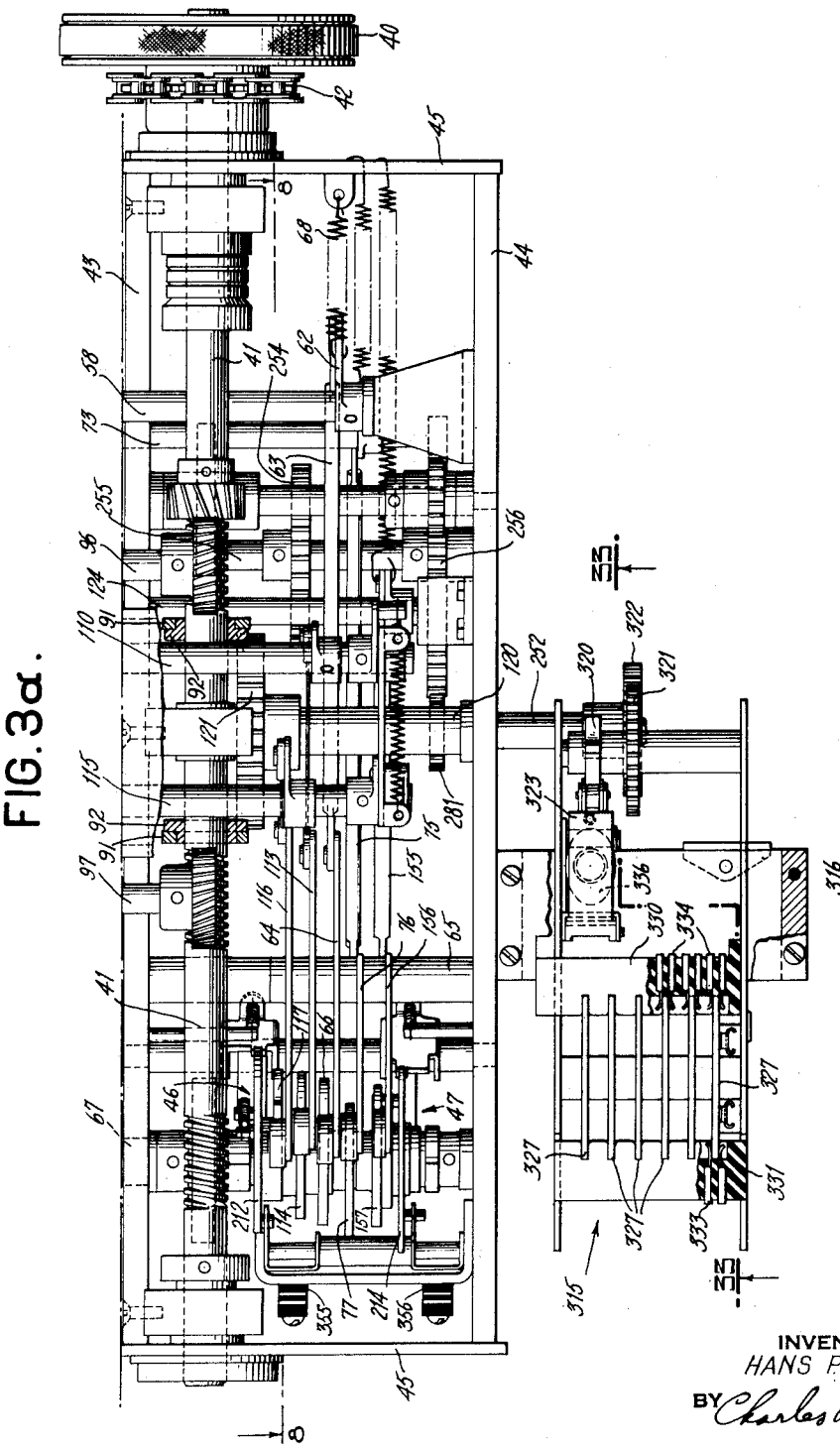

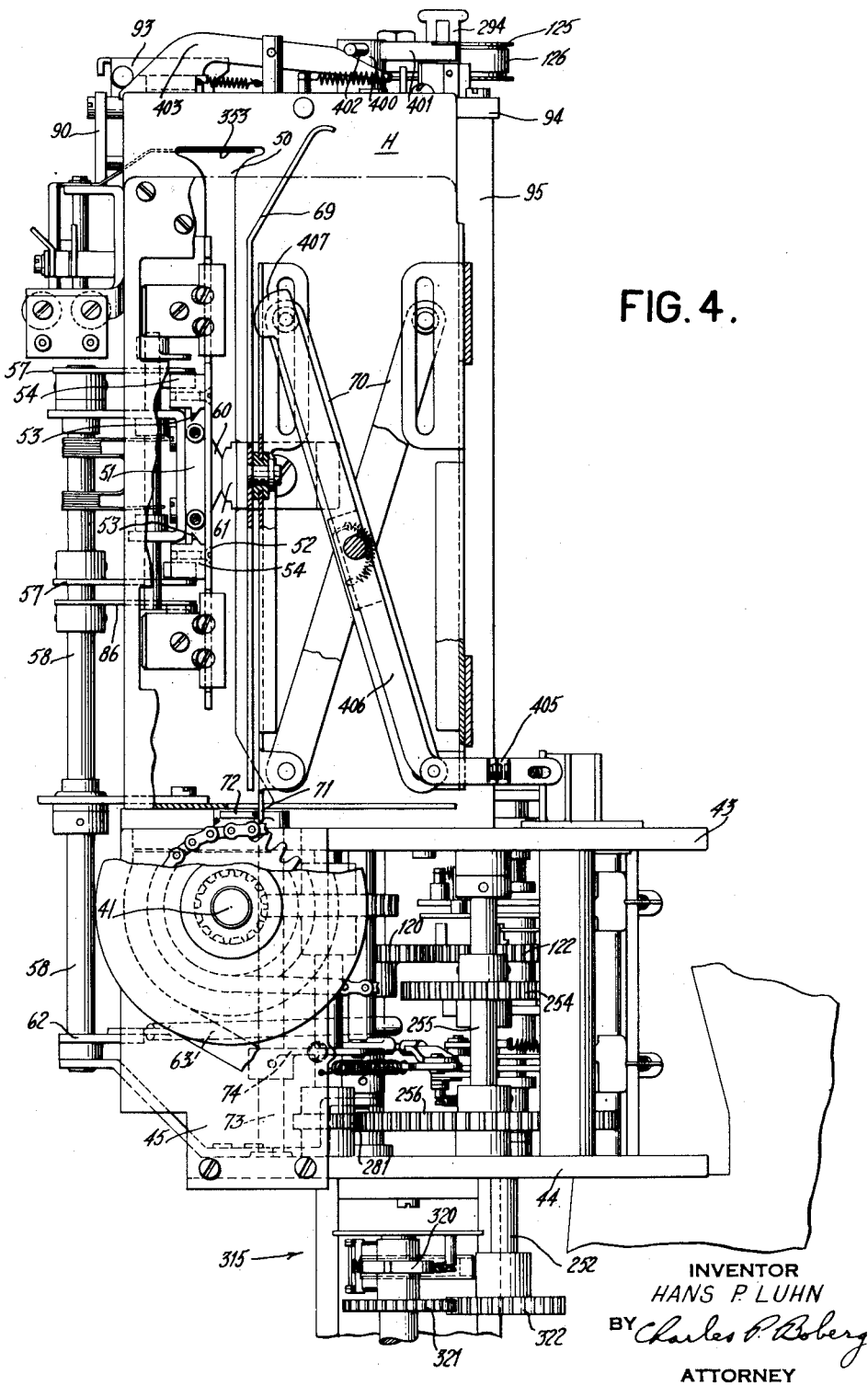

INVENTOR
HANS P. LUHN
BY Charles P. Boberg
ATTORNEY

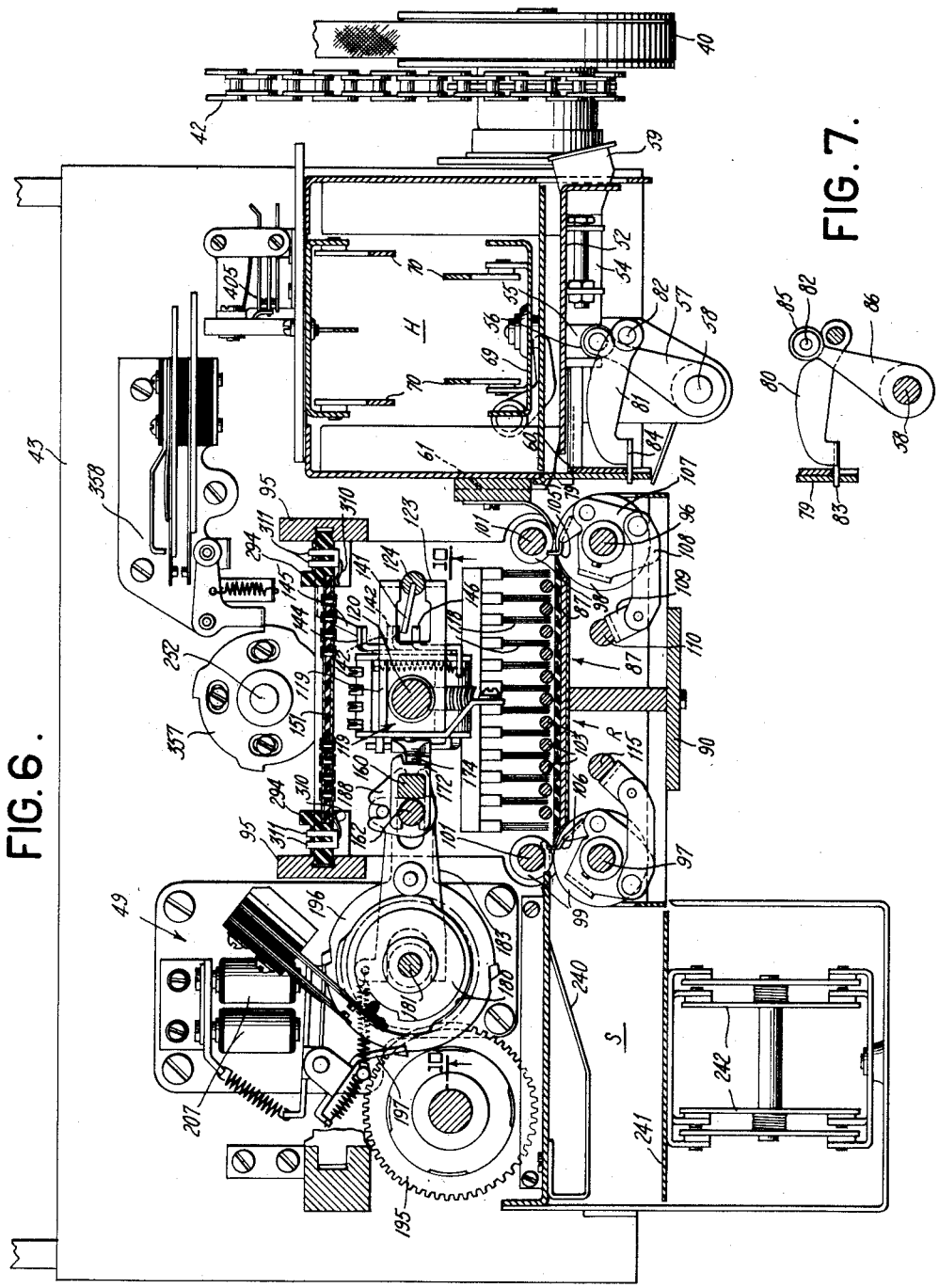

Oct. 28, 1952          H. P. LUHN          2,615,626
RECORD FEEDING AND ANALYZING APPARATUS
Filed May 20, 1950          21 Sheets-Sheet 7
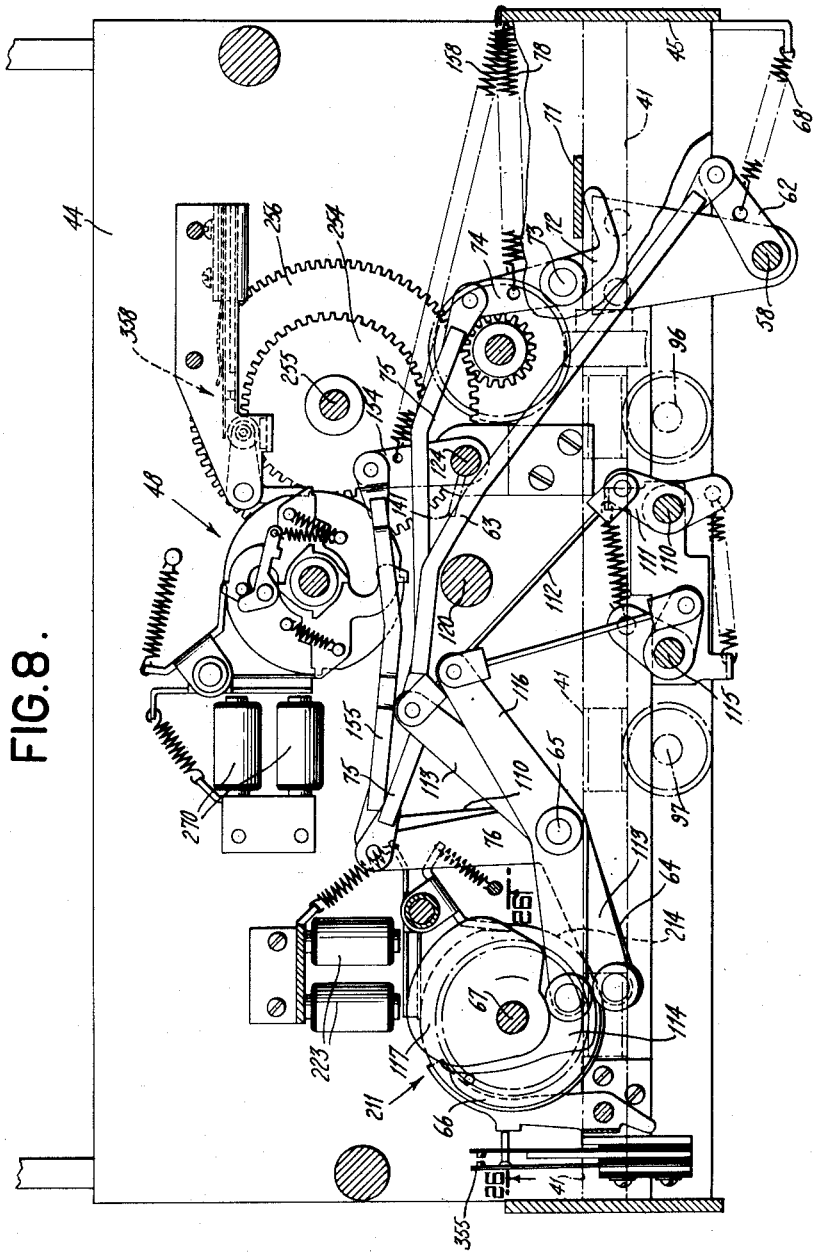
INVENTOR
HANS P. LUHN
BY Charles P. Boberg
ATTORNEY Oct. 28, 1952      H. P. LUHN      2,615,626
RECORD FEEDING AND ANALYZING APPARATUS
Filed May 20, 1950      21 Sheets-Sheet 9

INVENTOR
HANS P. LUHN
BY Charles P. Boberg
ATTORNEY

Oct. 28, 1952 — H. P. LUHN — 2,615,626
RECORD FEEDING AND ANALYZING APPARATUS
Filed May 20, 1950 — 21 Sheets-Sheet 10

INVENTOR
HANS P. LUHN
BY Charles P. Doberg
ATTORNEY

Oct. 28, 1952   H. P. LUHN   2,615,626
RECORD FEEDING AND ANALYZING APPARATUS
Filed May 20, 1950   21 Sheets-Sheet 11

INVENTOR
HANS P. LUHN
BY Charles P. Boberg
ATTORNEY

Oct. 28, 1952   H. P. LUHN   2,615,626
RECORD FEEDING AND ANALYZING APPARATUS
Filed May 20, 1950   21 Sheets-Sheet 12

INVENTOR
HANS P. LUHN
BY Charles P. Boberg
ATTORNEY

Oct. 28, 1952     H. P. LUHN     2,615,626
RECORD FEEDING AND ANALYZING APPARATUS
Filed May 20, 1950     21 Sheets-Sheet 13
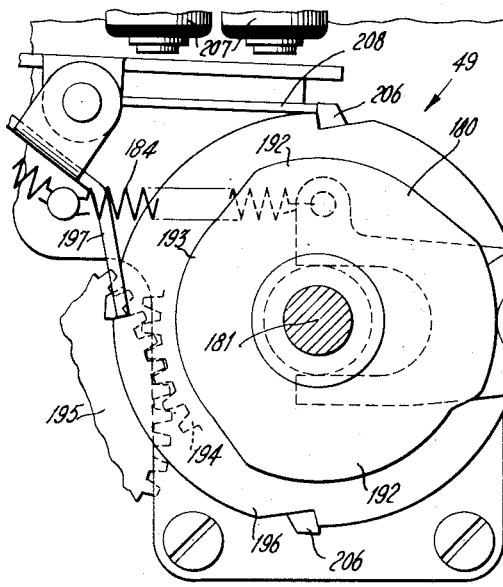
FIG. 19.
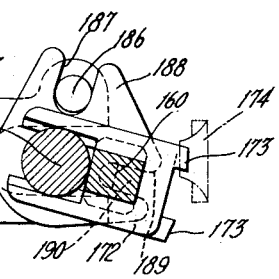
FIG. 22.
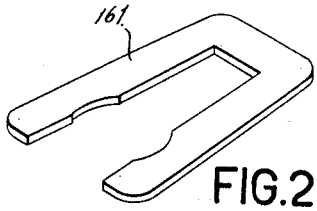
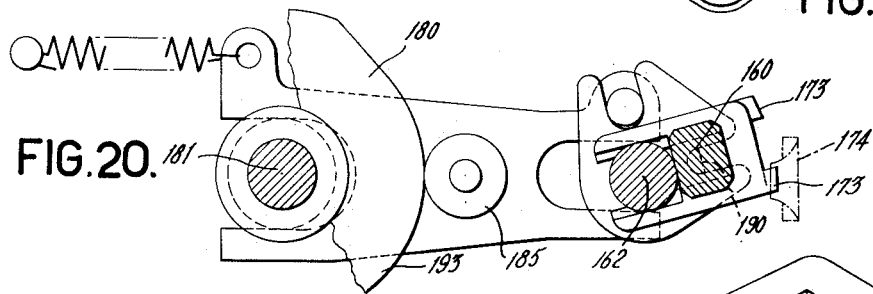
FIG. 20.     FIG. 23.
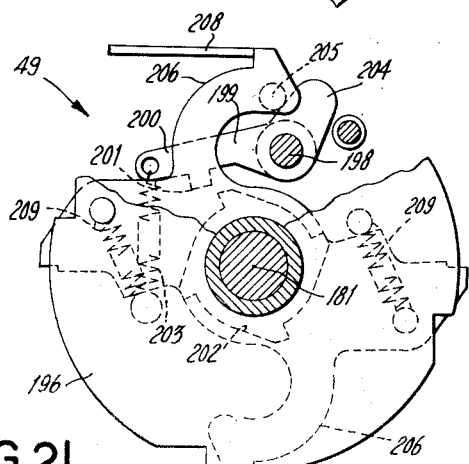
FIG. 21.
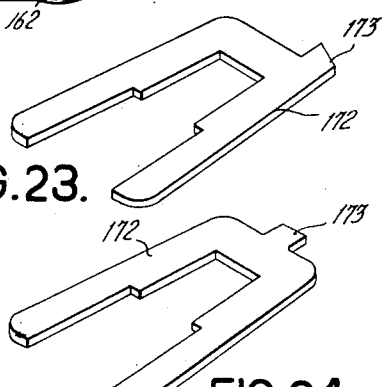
FIG. 24.
INVENTOR
HANS P. LUHN
BY Charles P. Boberg
ATTORNEY Oct. 28, 1952      H. P. LUHN      2,615,626

RECORD FEEDING AND ANALYZING APPARATUS

Filed May 20, 1950      21 Sheets—Sheet 15

INVENTOR
HANS P. LUHN
BY Charles P. Boberg
ATTORNEY

Oct. 28, 1952  H. P. LUHN  2,615,626
RECORD FEEDING AND ANALYZING APPARATUS
Filed May 20, 1950  21 Sheets-Sheet 16

INVENTOR
HANS P. LUHN
BY Charles P. Boberg
ATTORNEY

Oct. 28, 1952   H. P. LUHN   2,615,626
RECORD FEEDING AND ANALYZING APPARATUS
Filed May 20, 1950   21 Sheets-Sheet 17

INVENTOR
HANS P LUHN
BY Charles P. Boberg
ATTORNEY

Oct. 28, 1952 H. P. LUHN 2,615,626
RECORD FEEDING AND ANALYZING APPARATUS
Filed May 20, 1950 21 Sheets-Sheet 18

INVENTOR
HANS P. LUHN
BY Charles P. Boberg
ATTORNEY

Oct. 28, 1952    H. P. LUHN    2,615,626
RECORD FEEDING AND ANALYZING APPARATUS
Filed May 20, 1950    21 Sheets—Sheet 21

INVENTOR
HANS P. LUHN
BY Charles P. Boberg
ATTORNEY

Patented Oct. 28, 1952

2,615,626

UNITED STATES PATENT OFFICE 2,615,626

RECORD FEEDING AND ANALYZING APPARATUS

Hans Peter Luhn, Armonk, N. Y., assignor to International Business Machines Corporation, New York, N. Y., a corporation of New York Application May 20, 1950, Serial No. 163,250

36 Claims. (Cl. 235—61.11)

This invention relates to record-controlled recording machines, and particularly to means for feeding and analyzing record cards to control the operations of typewriters, tape punches or similar recording devices.

When operating a character-by-character printing machine (such as a typewriter or a column-by-column punching machine) under the control of a record card, it is customary to feed the card lengthwise past a group of aligned brushes or other sensing devices which sense the record card in column-by-column fashion, and as each card column is sensed, the data character represented therein is recorded on a suitable sheet or sheets by one or more of the recording instrumentalities in the machine. Selected columns of the card can be skipped, and the information recorded therein is omitted from the record which is being prepared. Some form of programming means usually is employed to determine the selection of recording units for operation as the card is being sensed. Such programming means may take the form of a perforated tape, for example, or some equivalent device.

It has been found desirable in many instances to change the order in which consecutive fields of a record card are reproduced. Assuming that a card has three fields A, B and C arranged in sequence lengthwise of the card, one may desire, for example, to record the field A information first, followed by the field C information, and then record the field B information last. Or it may be desired to sense all three fields A, B and C in a first sensing operation, then go back to field B alone and re-sense this field in order that the information contained therein can be recorded a second time on the same document. With the machines that have been developed thus far, these operations would be extremely inconvenient or impossible. To sense a card repeatedly and selectively in these prior machines would require sending the card a number of times through the same reading station or through a plurality of reading stations. An alternative method which has been proposed is to employ card data storage means for holding the data read from a card as long as the same is needed. These methods are subject to various disadvantages, in view of which it is desirable that a different approach be made to the problem.

An object of the present invention, therefore, is to provide an improved card reading means which is adapted to sense a record card or any selected portion thereof in column-by-column fashion a plurality of times without feeding the card repeatedly through a reading station and without resorting to plural reading stations or data storage means.

More specifically, it is a primary object of this invention to provide an improved card sensing means for a card-controlled recording machine in which a selected portion of the card may be skipped on the first reading and sensed in a subsequent reading, or repeatedly sensed during a plurality of consecutive readings, such sensing means being characterized by a movable brush assembly which travels over the card in accordance with a preselected sequence of operations.

A further object is to provide an improved card feeding and analyzing means which minimizes the distance that the cards must travel and simplifies the movements that are executed by the cards in passing through the machine.

Another object is to provide an improved card sensing means and an improved card column emitter which are more intimately associated with each other and are of more versatile character than those which have been employed heretofore in similar applications.

Still another object is to provide for more positive feeding of the cards and to prevent static electricity from interfering with the correct placement of cards in the stack when they are ejected.

A still further object is to provide a novel program control means of pluggable character for increasing the flexibility of machine operations.

The invention features simplicity and compactness of the card feed. Each card, as it passes through the machine, travels in a straight path which extends transversely relative to the length of the card, and the total travel of the card from the supply hopper to the eject compartment is only a little more than the width of two cards.

Another feature is the movable brush assembly having a set of reading brushes which sweep lengthwise over the card while the same is stationary and having another set of brushes which sweep over an emitter strip for effecting control functions of the machine at selected points in the travel of the brush assembly.

As another feature of the invention, the brush assembly is mounted on a carriage driven by a screw-threaded driving shaft which is rotatable at various speeds according to whether the card columns are being read or skipped.

As still another feature, there is provided an automatic tab stop mechanism whereby the brush carriage, after completing its travel over the stationary card, can be returned to any selected point on the card for sensing columns which were previously skipped or for re-sensing columns that were previously read.

Yet another feature is the removable, pluggable emitter board that cooperates with the brush assembly, and a further feature is the provision of a pluggable stepping switch in conjunction with the pluggable emitter board for controlling the program functions of the machine.

A still further feature is the novel card ejecting means which insures that the cards in the ejected stack will not separate from each other due to static electrical charges before a newly ejected card is deposited on top of the stack. This prevents the newly ejected card from being inadvertently slipped into an opening in the stack.

Other objects of the invention will be pointed out in the following description and claims and illustrated in the accompanying drawings, which disclose, by way of examples, the principle of the invention and the best mode, which has been contemplated, of applying that principle.

Figure 1:
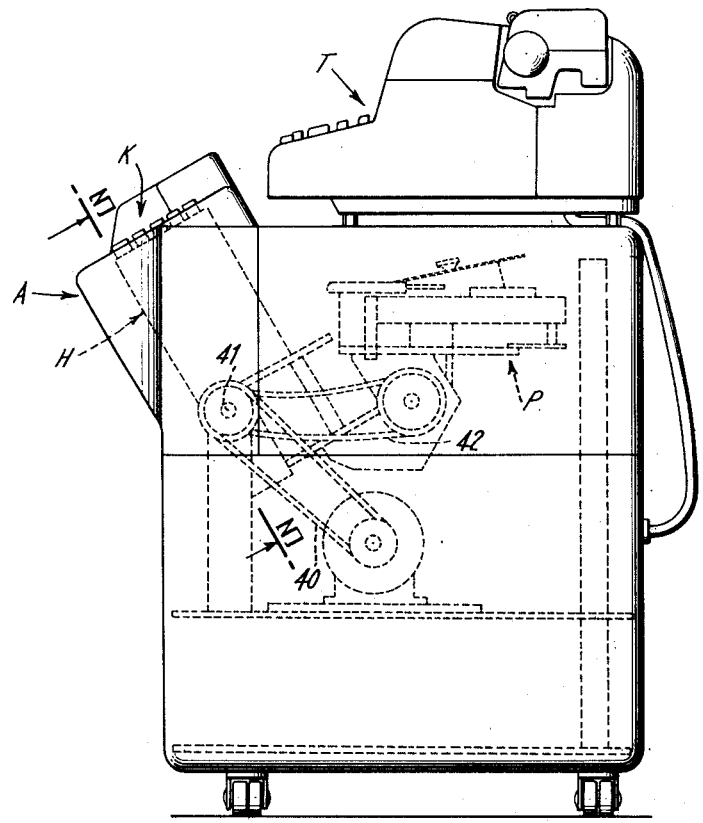
Fig. 1 is a side elevational view of a card-controlled recording machine constructed in accordance with and embodying the principles of the invention.

Fig. 3 and 3a together comprise a front elevational view of the card feeding and analyzing apparatus in said machine, this view being taken substantially on the line 3—3 in Fig. 1, with the housing of said apparatus being omitted.

Fig. 4 is a side elevational view of the card feeding and analyzing apparatus.

Figure 5:
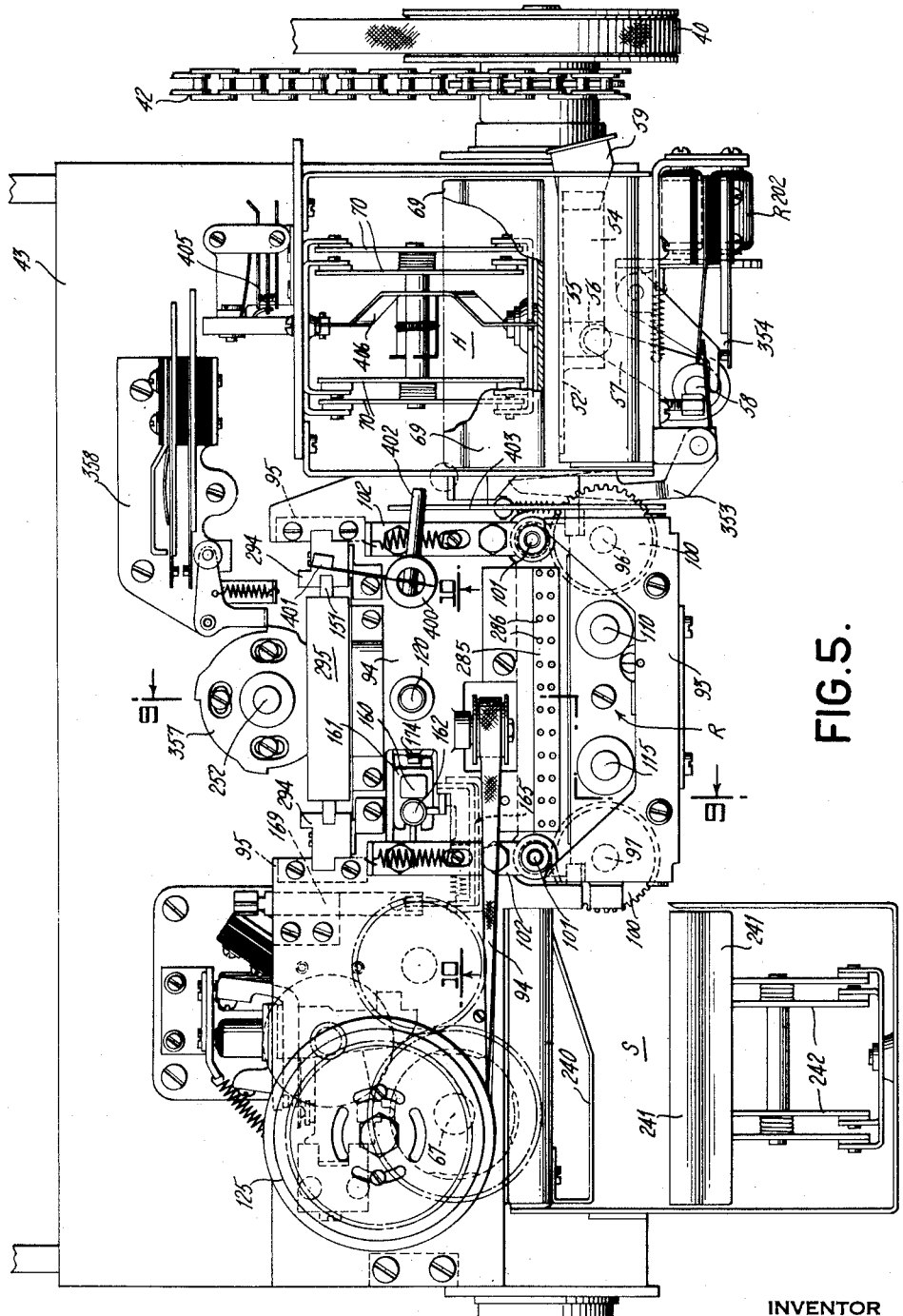

Fig. 5 is a plan view of said apparatus.

Fig. 6 is a transverse sectional view of said apparatus taken substantially on the line 6—6 in Fig. 3.

Fig. 7 is a transverse section on the line 7—7 in Fig. 3, showing details of a gate actuating mechanism in the card feed of the machine.

Fig. 8 is a transverse section on the line 8—8 in Fig. 3a, showing certain mechanisms included in the drive assembly of said apparatus.

Figure 9:
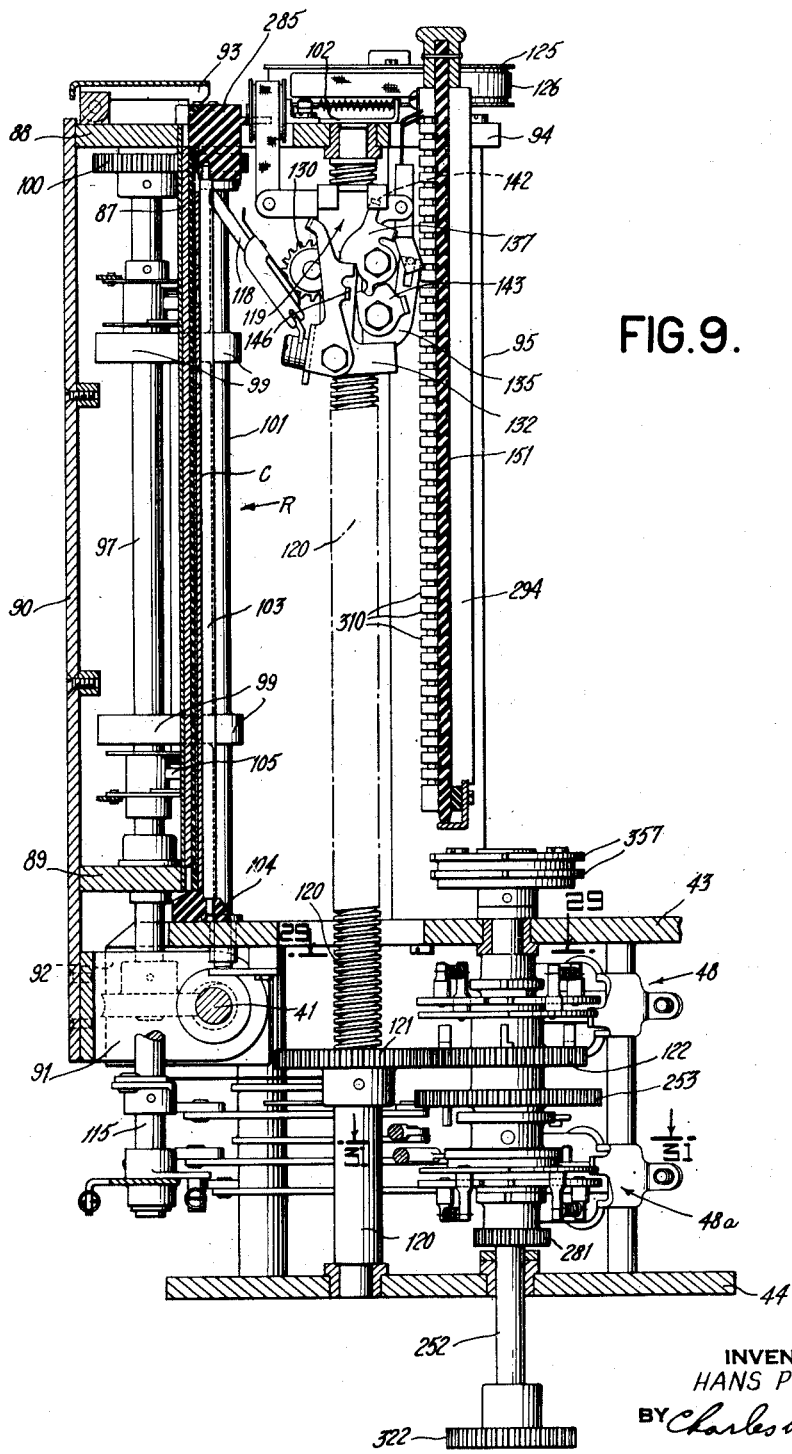

Fig. 9 is a vertical sectional view taken on the line 9—9 in Fig. 5.

Figures 10, 10A:
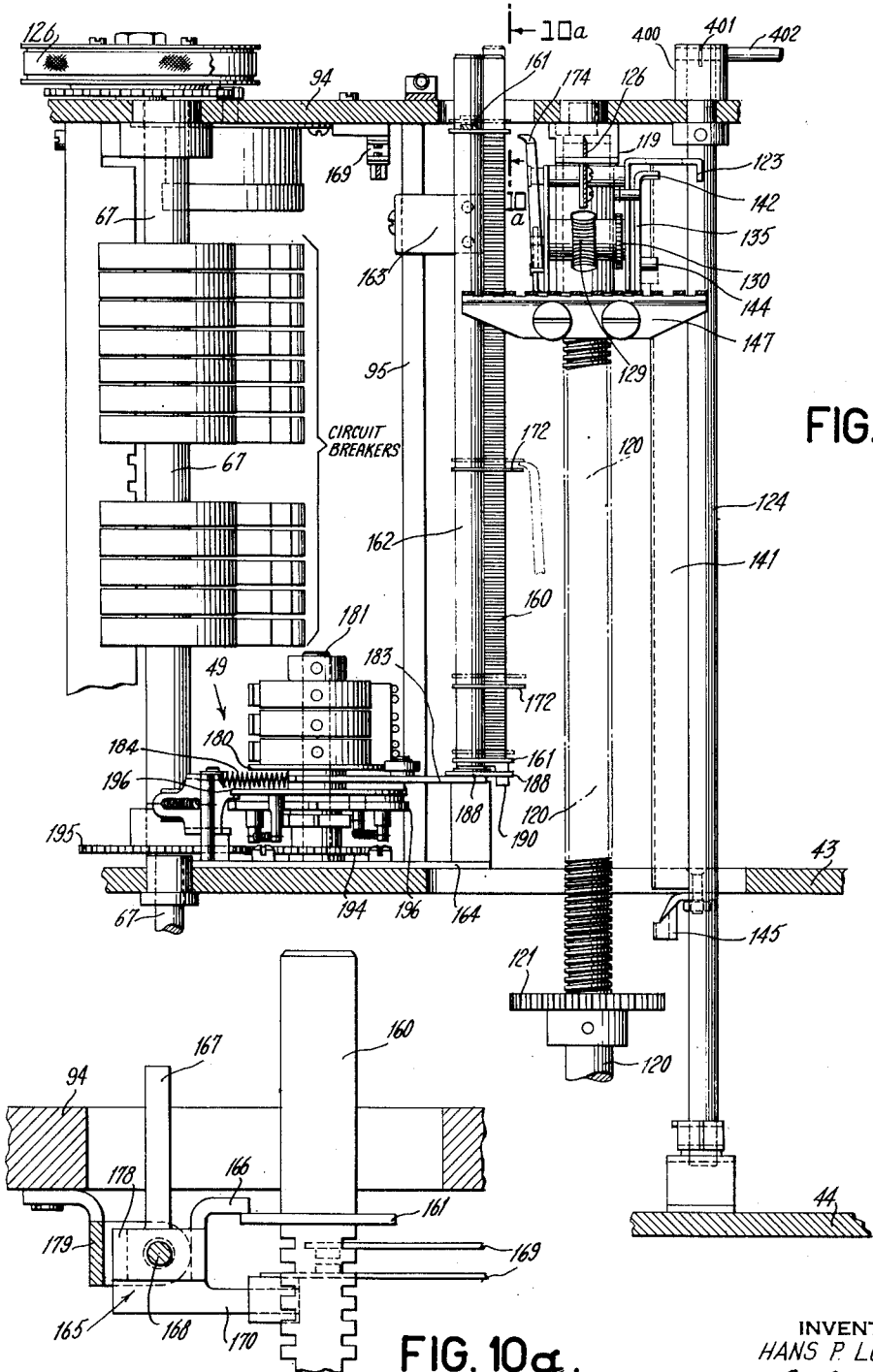

Fig. 10 is a vertical section taken on the line 10—10 in Fig. 5.

Fig. 10a is a sectional view taken on the line 10a—10a in Fig. 10.

Figure 11:
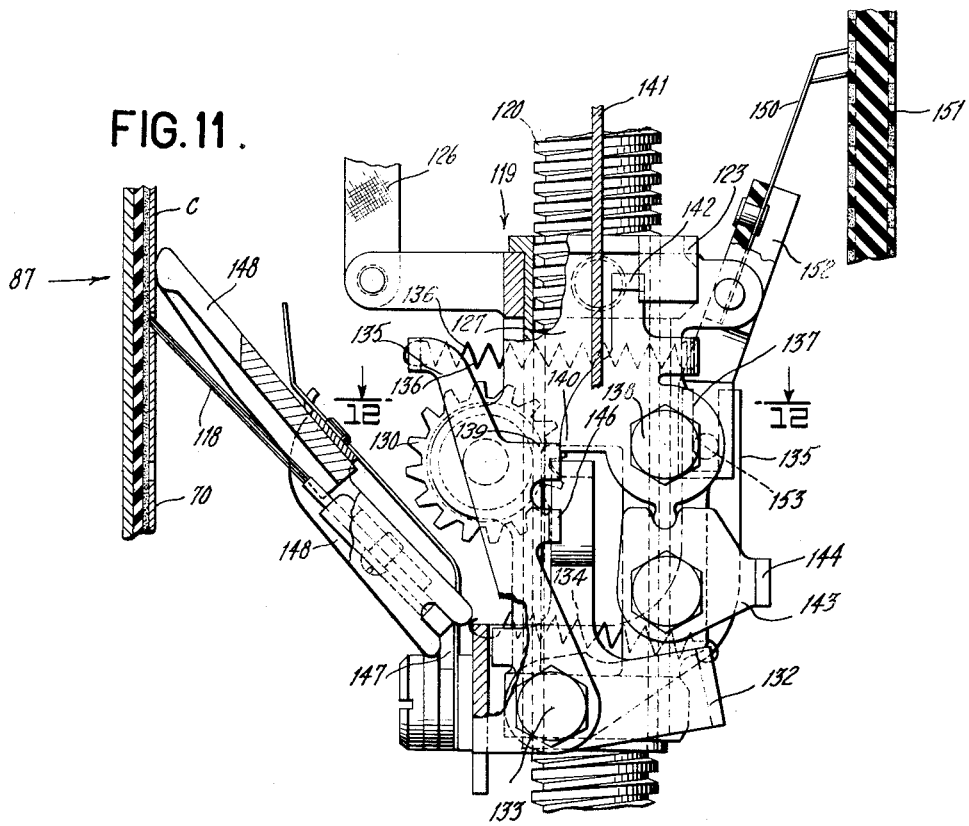

Fig. 11 is an enlarged sectional view showing details of a card reading brush carriage generally illustrated in Fig. 9.

Figure 12:
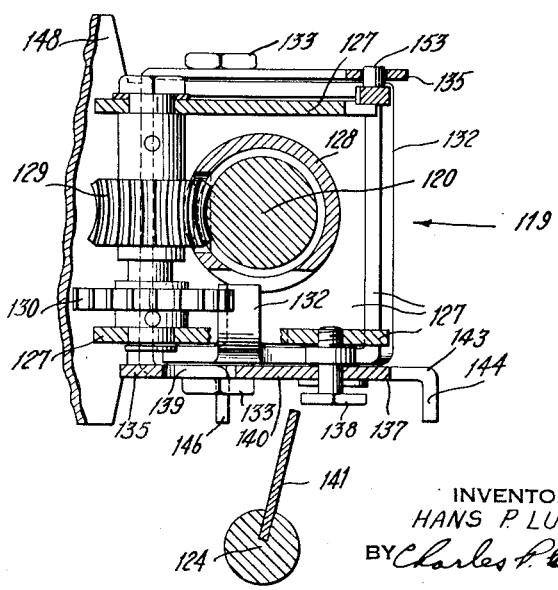

Fig. 12 is a transverse section on the line 12—12 in Fig. 11.

Figure 13:
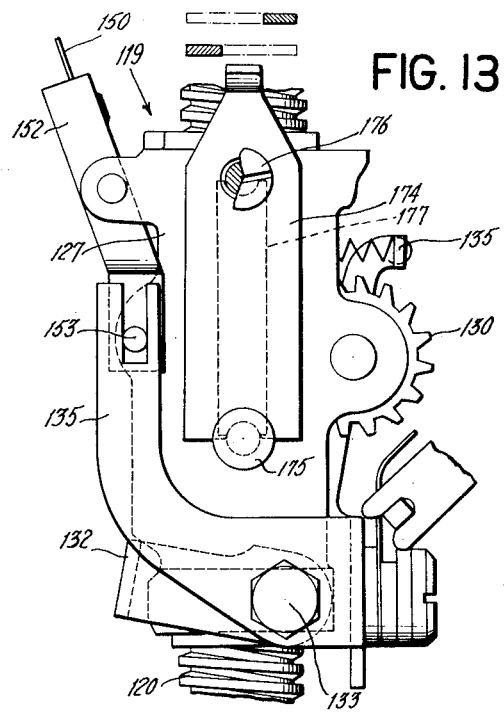

Fig. 13 is a detail view showing the reverse side of the brush carriage structure illustrated in Fig. 11.

Figure 14:
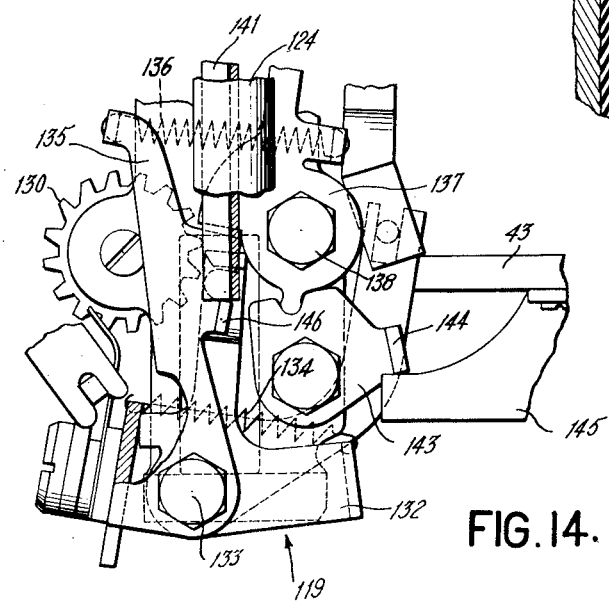

Fig. 14 is a detail view of the brush carriage structure with the parts thereof shown in the positions that they occupy when the carriage reaches the lower end of its travel.

Figure 15:
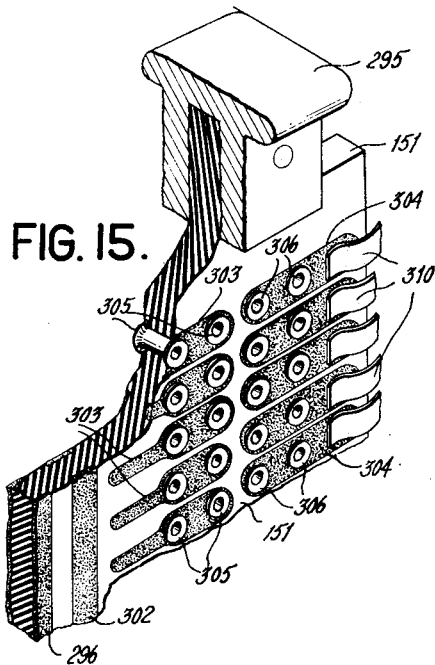

Fig. 15 is a fragmentary perspective view of an emitter plugboard employed in the card reading section of the machine.

Figure 16:
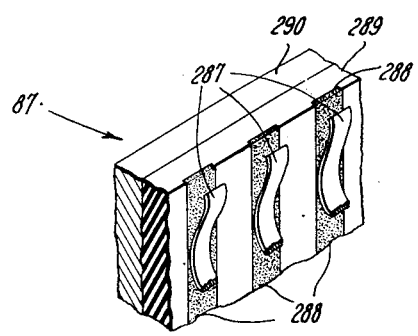

Fig. 16 is a fragmentary perspective view showing a portion of a contact plate in the card reading section of the machine.

Figure 17:
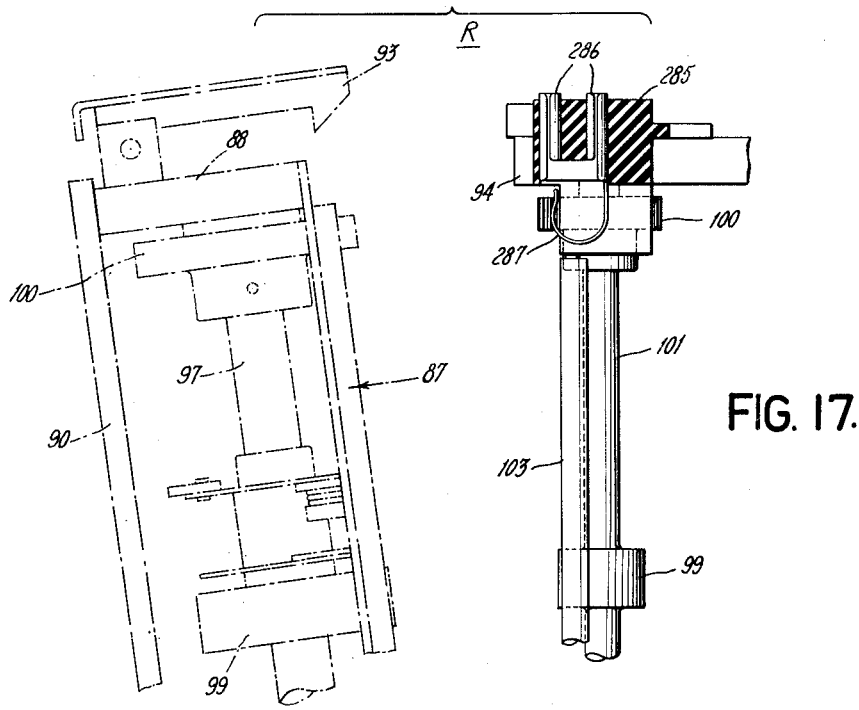

Fig. 17 is a fragmentary vertical sectional view showing in greater detail certain parts of the mechanism illustrated in Fig. 9, and also indicating the open position of the mechanism.

Figure 18:
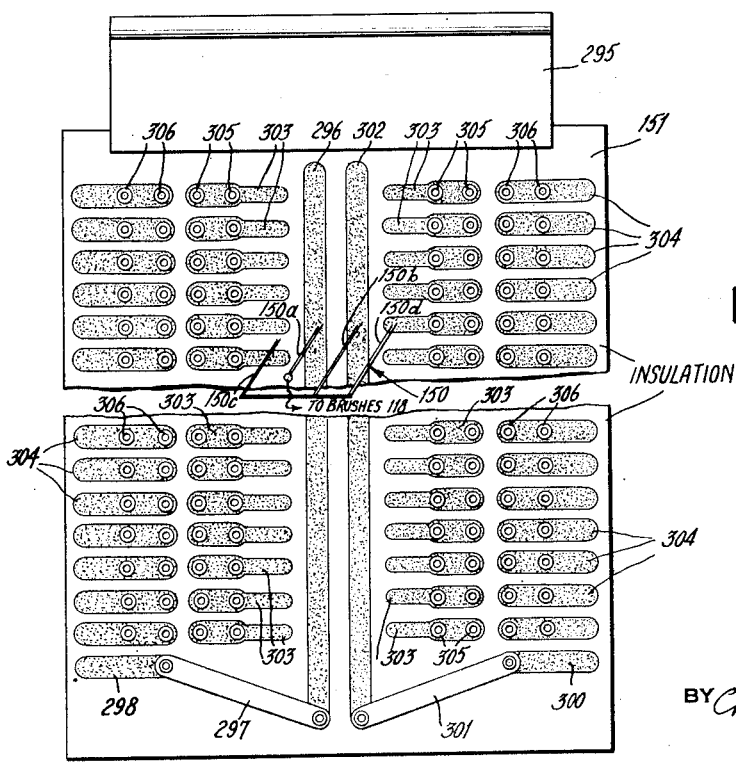

Fig. 18 is an elevational view of the emitter plugboard shown in Fig. 15 and also indicating the relationship of the sensing brushes to said plugboard.

Fig. 19 is a sectional view illustrating certain details of a tab bar operating mechanism shown generally in Fig. 6.

Fig. 20 is a partial section similar to Fig. 19 but showing certain parts of the mechanism in different positions.

Fig. 21 is a detail sectional view of the tab bar clutch mechanism.

Fig. 22 is a perspective view of a supporting ear for the tab bar.

Figs. 23 and 24 are perspective views showing different forms of tab stops which may be used on the tab bar.

Figs. 25, 25a, 25b, 25c and 25d are schematic views which illustrate the method of feeding and ejecting record cards in accordance with the invention.

Figure 26:
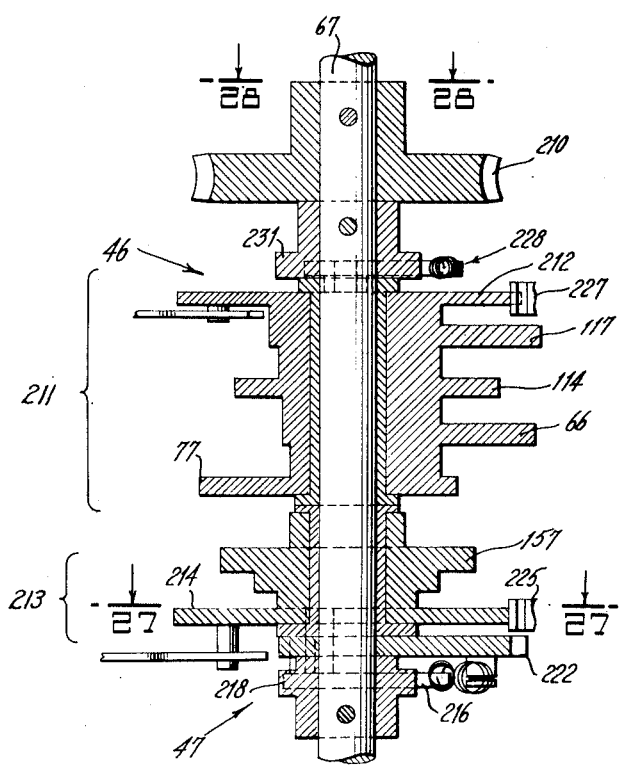

Fig. 26 is a sectional view on the line 26—26 in Fig. 8, showing portions of the certain clutch and cam assemblies which control the feeding and analyzing of cards by the machine.

Figure 27:
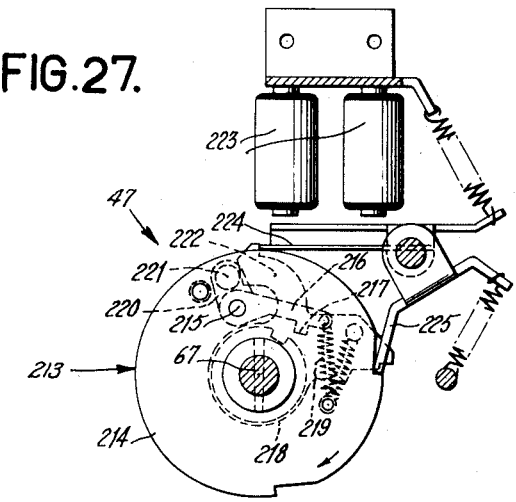
Figure 28:
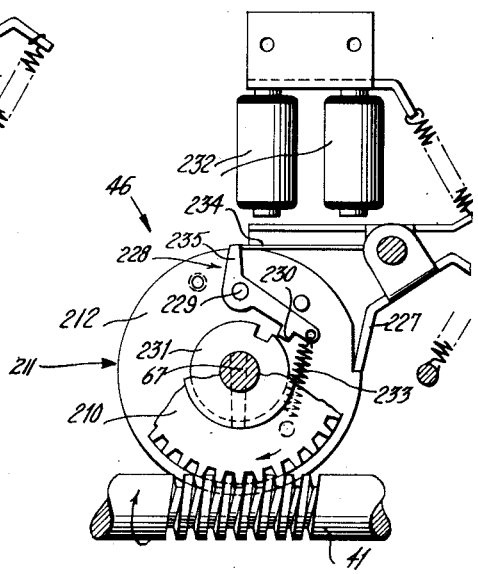

Figs. 27 and 28 are transverse sections taken on the lines 27—27 and 28—28, respectively, in Fig. 26, illustrating certain clutch mechanisms in the aforesaid assemblies.

Figure 29:
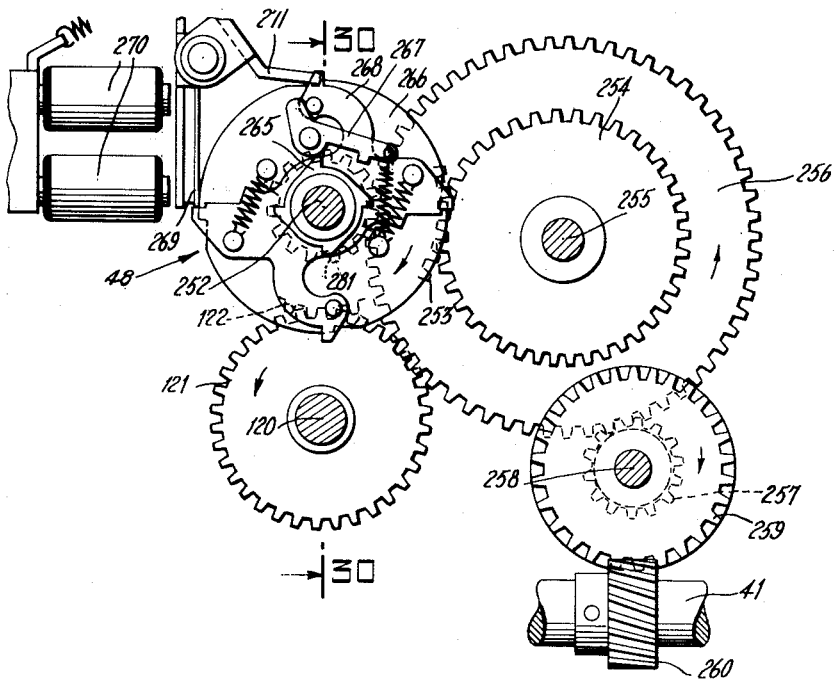

Fig. 29 is a sectional view showing in detail a clutch and drive mechanism generally illustrated in Fig. 8, for controlling the normal sensing movement of the card reading brush carriage, this view corresponding substantially to a section taken on the line 29—29 in Fig. 9 and rotated through 90 degrees.

Figure 30:
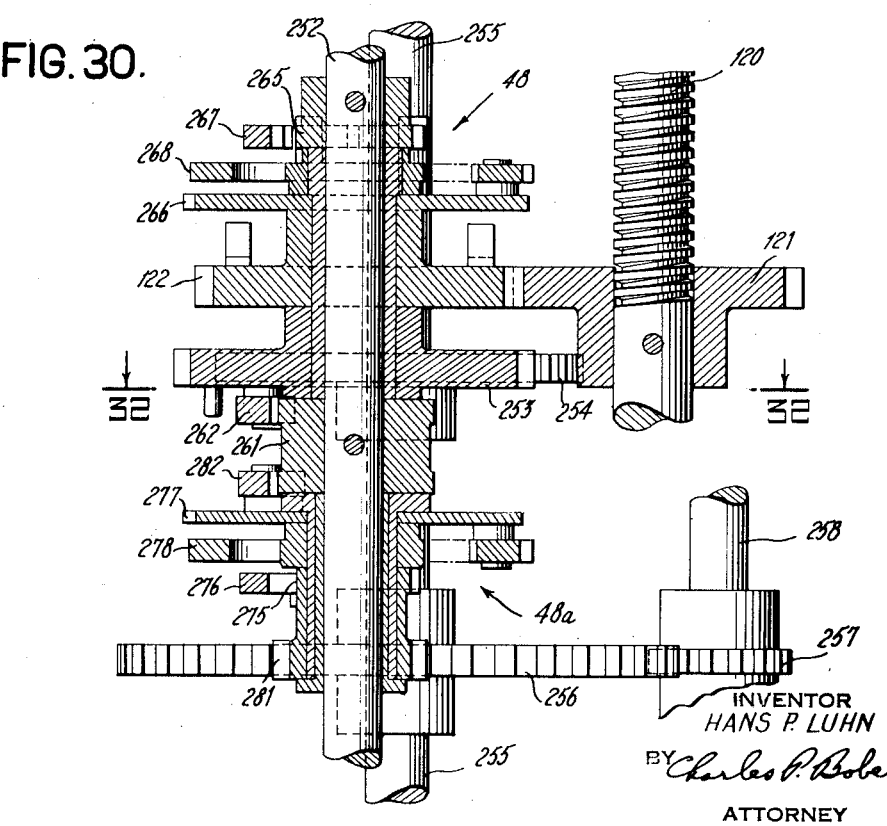

Fig. 30 is a sectional view taken on the line 30—30 in Fig. 29.

Figure 31:
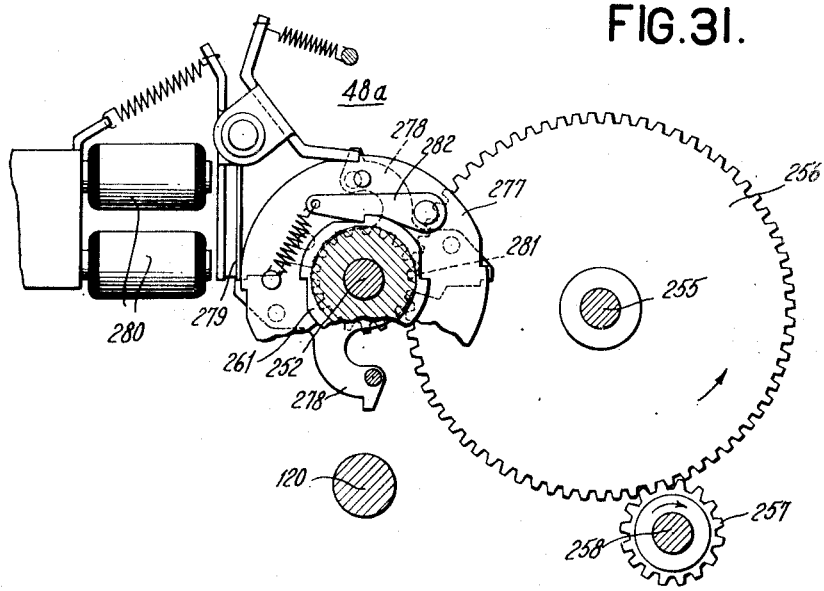

Fig. 31 is a sectional view similar to Fig. 29 but illustrating a different clutch and drive mechanism for effecting the skip movement of the card reading brush carriage, this view corresponding substantially to a section taken on the line 31—31 in Fig. 9 and rotated through 90 degrees.

Figure 32:
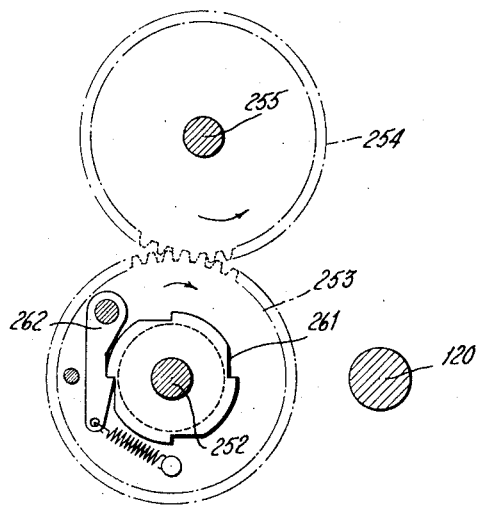

Fig. 32 is a section on the line 32—32 in Fig. 30.

Figure 33:
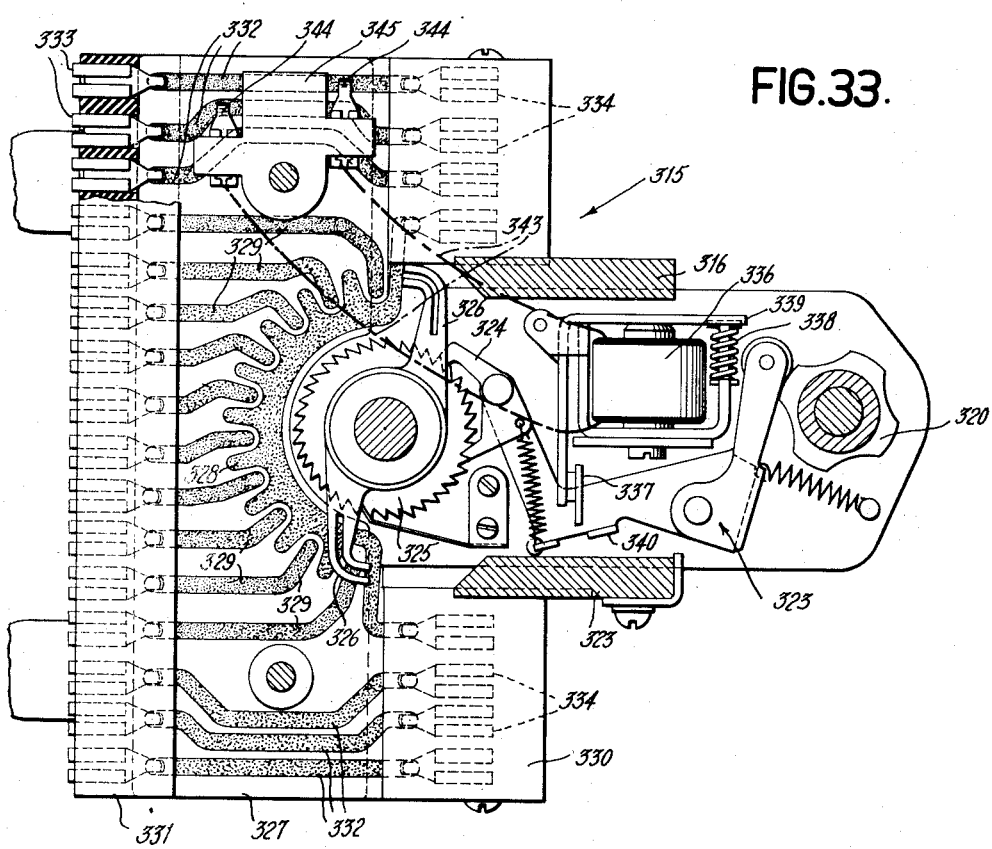

Fig. 33 is a sectional view taken on the line 33—33 in Fig. 3a, showing a program stepping switch arrangement used in the machine.

Figure 34:
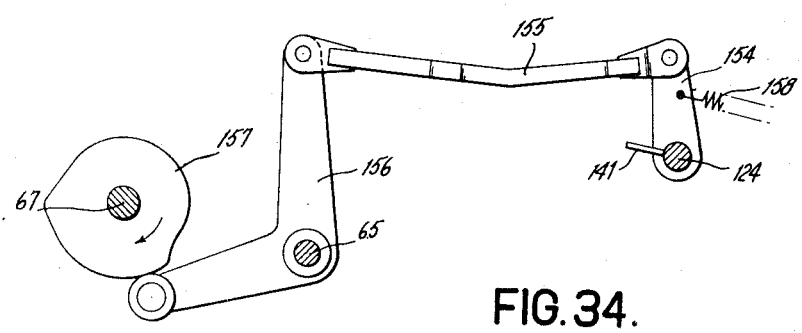

Fig. 34 is a detail sectional view illustrating a brush carriage control mechanism partially shown in Fig. 8.

Figure 35:
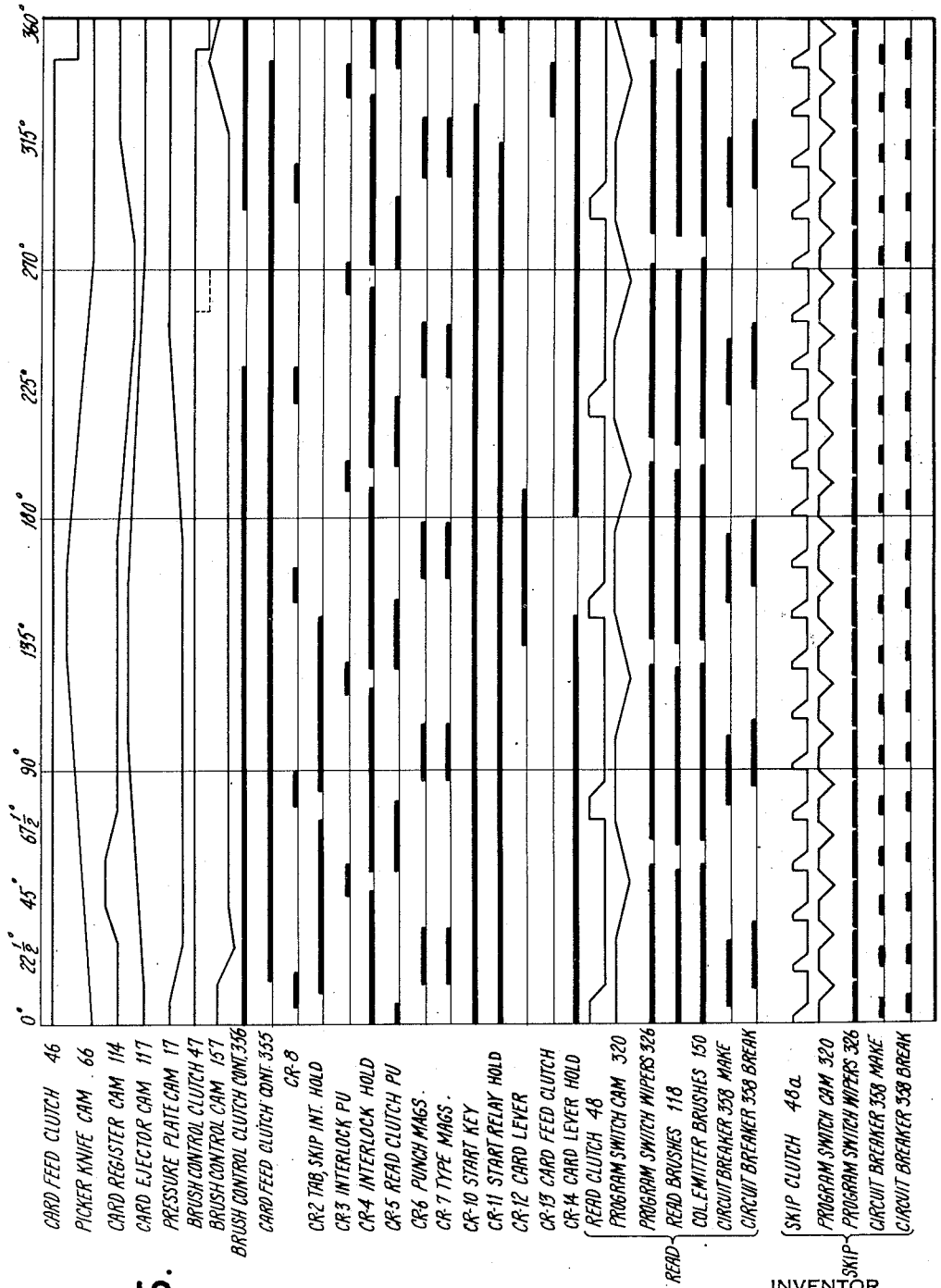

Fig. 35 is a timing chart of the machine.

Figure 36:
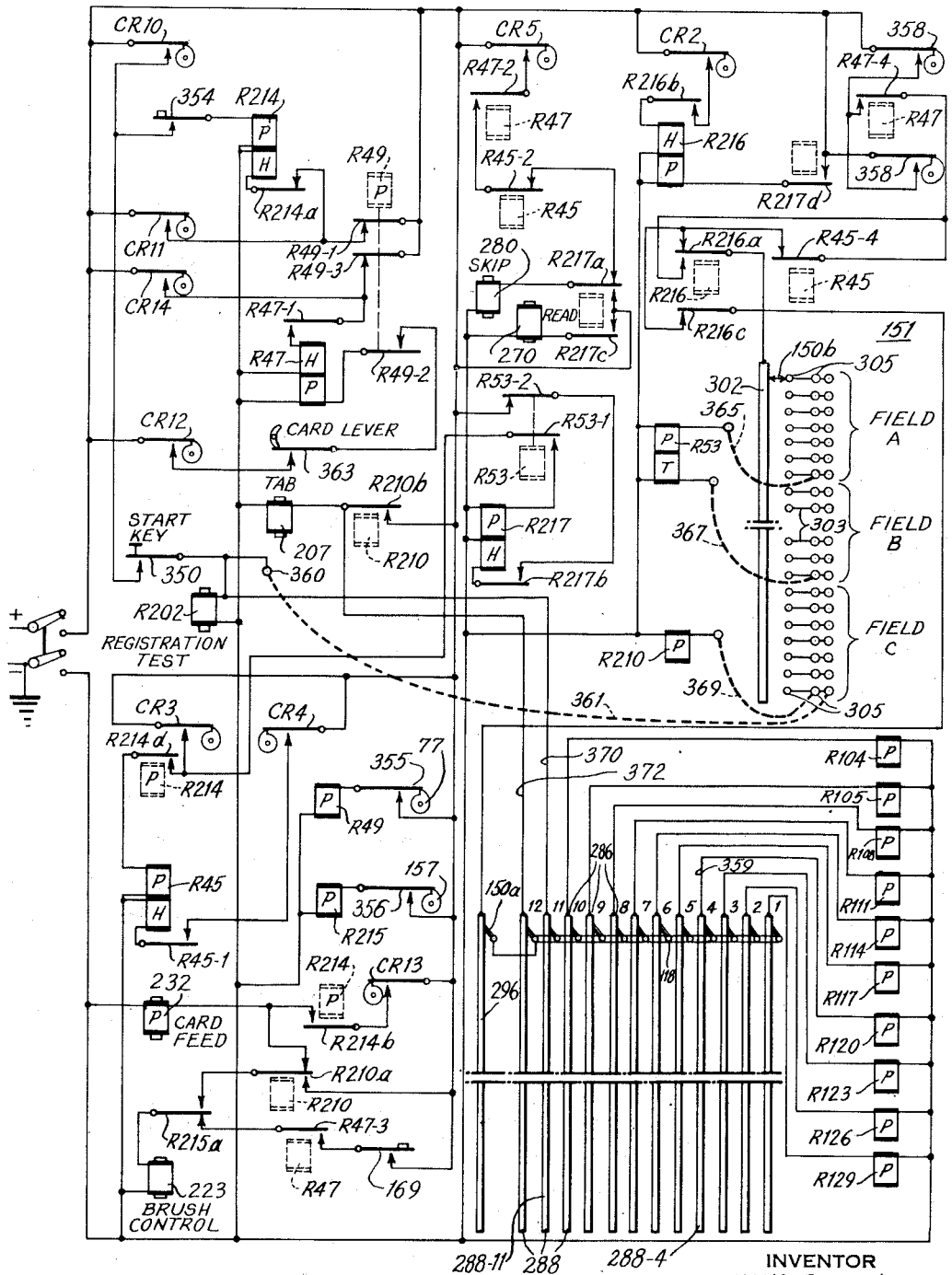

Fig. 36 is a wiring diagram showing certain electrical circuits which may be employed in the machine to control the operations of feeding and analyzing the cards.

Figure 37:
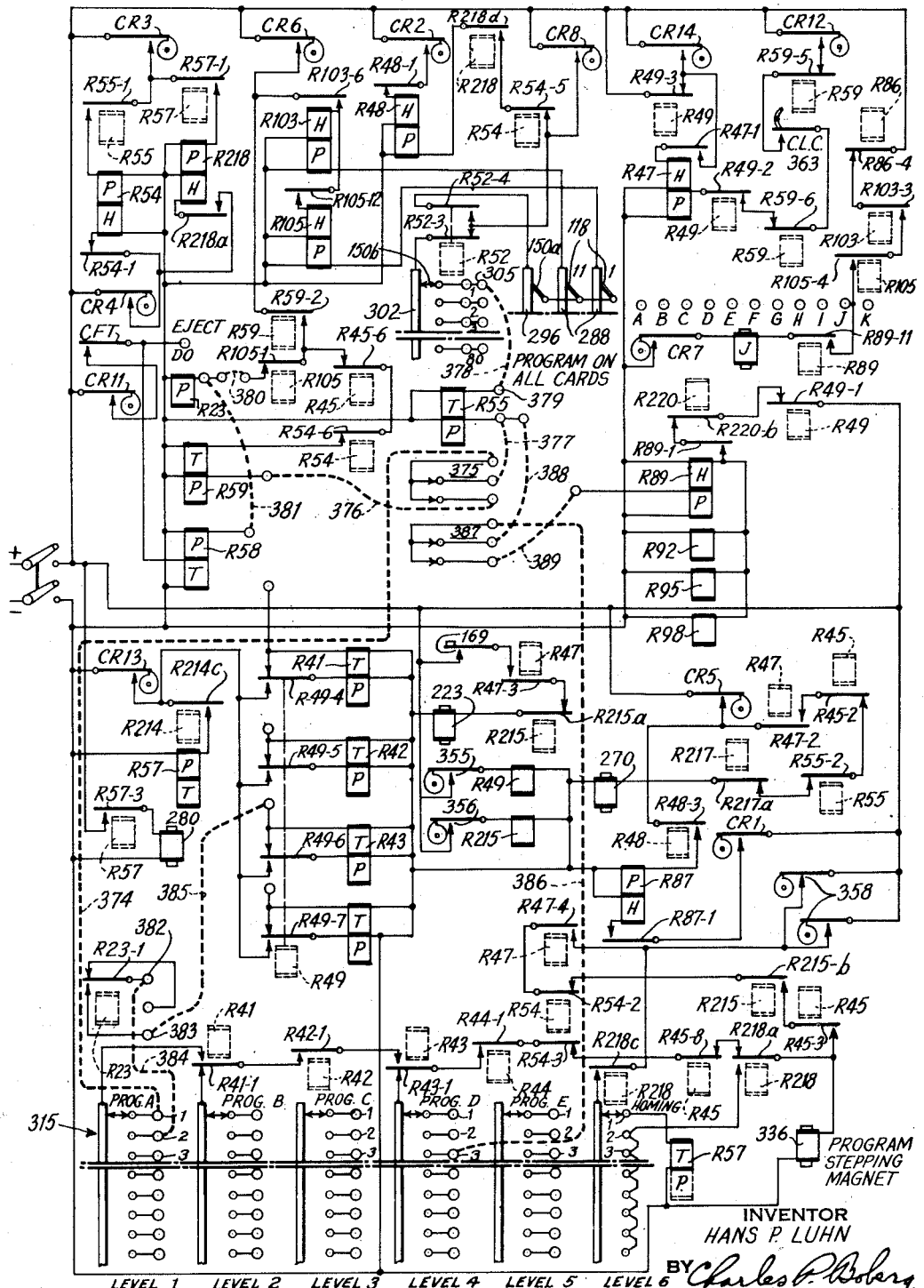

Fig. 37 is a modified circuit diagram showing the manner in which the program stepping switch may be incorporated in the electrical circuits of the machine.

GENERAL FEATURES

Figure 2:
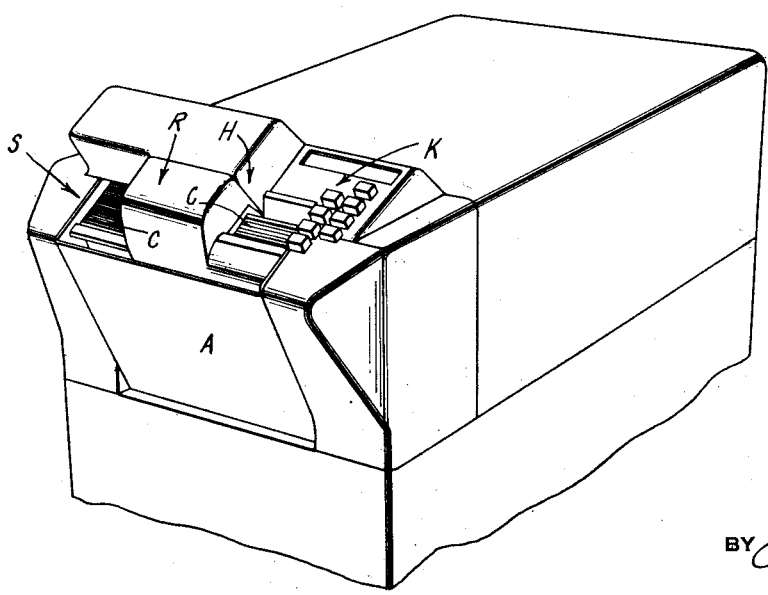
Fig. 2 is a partial front perspective view of said machine.

A card-controlled recording machine embodying the invention is illustrated generally in Figs. 1 and 2. This machine contains card feeding and analyzing apparatus, designated A, which is powered by a motor M through the medium of a belt 40 (Fig. 1). The machine housing is so designed that it will support a typewriter T (Fig. 1) which is cable-connected to the machine proper. A second typewriter (not shown) may also be connected to the machine. The operations of either or both of these typewriters are controlled by record cards in the card feeding and analyzing unit A of the machine. A tape punch unit P (Fig. 1) also may be included in the machine, this punch unit being driven by the main drive shaft 41 of the unit A through the medium of a sprocket chain 42. The typewriters and the tape punch are of well known construction and therefore are not shown in detail.

The card feeding and analyzing apparatus A has a card hopper H (Fig. 2) adapted to receive record cards C and to support such cards approximately in an upright position slightly inclined from the vertical. The operator will be positioned in front of the machine, where she can have easy access to card files from which cards may be withdrawn and inserted in the hopper H. This hopper will accommodate a large number of cards, or single cards, as desired. The record cards are of the well-known type having a series of transverse columns in which data characters are respectively recorded in accordance with a statistical code. These cards are positioned in the hopper H with their transverse columns extending laterally.

The cards C are fed successively from the hopper H in a lateral direction to an adjoining card reading station R in the machine, where the columns of each card are successively sensed to effect the recording of data characters by the various character-by-character recording instrumentalities (typewriter T and column-by-column tape punch P, for example) which are controlled by the machine. A suitable programming means (described hereinafter) causes the recording units to be operated selectively under the control of the cards according to a selected program of operations, as determined by the setting up of the program control means and by special designations in the cards themselves. This, in general, is familiar practice to those skilled in the art, and the present invention incorporates certain improvements in the program control, to the end of making it more convenient and flexible.

After being analyzed at the reading station R (Fig. 2) the record cards are successively ejected laterally to a stacker box S, where they are caused to occupy the same relative positions (facing the operator of the machine) as they had when they were introduced into the hopper H. Because of the novel arrangement of the card feeding means, described more in detail hereinafter, the first card of the pack is visible to the operator both before and after the feeding of the cards, and the card pack taken from the stacker box S may be placed directly back into the original card files without rearrangement thereof, since the same order is preserved throughout.

In traveling from the card hopper H to the stacker box S, each card moves through a distance slightly greater than two card widths. Because of this minimum amount of card movement, the card feeding and analyzing apparatus A can have an extremely compact form. Moreover, each card, while at the reading station R, can be sensed any desired number of times by a moving brush arrangement later described herein. Selected fields of the card can be skipped in one reading and read in a subsequent reading, to vary the sequence in which information is read out from the card. A manually settable data storage unit (not shown), manipulated by the operator, may be employed in conjunction with the card reading means to insert additional information into the records which are being prepared by the machine, such insertion of data taking place automatically as determined by the programming means.

Normally the operator's only task is to select the appropriate cards from the card files, place these cards in the hopper H, and remove them from the stacker box S at the proper times. The hopper H can be kept filled continuously with new cards. Certain special functions of the machine, such as starting, stopping, error correction and a few other functions, are manually controlled by the manipulation of special function keys K. All program functions are set up by preliminary plugging of the program control means, and it is not necessary for the operator to supervise these.

DETAILED DECRIPTION

Drive unit

The drive unit comprises an upper frame plate 43 (Fig. 3a), a lower frame plate 44 and side plates 45. The main drive shaft 41 extends through the side plates 45 and is journaled in suitable bearings attached to the upper frame plate 43.

Various clutch assemblies are employed to transmit power from the main drive shaft 41 to the operative mechanisms of the machine. These clutch assemblies are as follows:

A card feed clutch and cam assembly 46 (Figs. 3a, 26 and 28).

A brush control clutch and cam assembly 47 (Figs. 3a, 26 and 27).

A card read clutch assembly having two separate clutch portions, consisting of a clutch portion 48 (Figs. 9, 29 and 30) which controls the normal reading of a card, and a clutch portion 48a (Figs. 9, 30 and 31) which controls skipping operations in the reading of a card.

A tab control clutch and cam assembly 49 (Figs. 3, 10, 19 and 21) which serves to position tab stops as required for determining the positions at which the carriage is arrested during its return movements.

Card hopper and associated parts

The card hopper H is illustrated in Figs. 3, 4, 5 and 6. It consists essentially of a box which is open at the top for receiving cards and having a slit 50 (Fig. 4) on the side facing the card reading station R (Figs. 5 and 6) for admitting cards one at a time to said station. A stationary spacing member 51 (Figs. 3 and 4) on the front of the hopper H supports a slidable card platform 52 having rails 54 which are received in grooves 53 in the edges of the member 51, as shown best in Fig. 4. The rails 54 have forwardly extending grooves 55 (Fig. 6) therein which receive rollers 56 (Figs. 3 and 6) mounted on rocker arms 57 carried by a shaft 58 suitably journaled on the front of the hopper H. Oscillation of the shaft 58 causes the card platform 52 to slide laterally toward and away from the reading station R. Card pickers 59 of known construction mounted on the platform 52 are adapted to engage and feed a single card C (see Figs. 25 to 25d) from the hopper H through a throat defined by a block 60 and an adjustable knife 61 each time that the platform 52 is reciprocated.

The shaft 58 which drives the card pickers has a rocker arm 62, best shown in Fig. 8, which is connected by a link 63 to a cam follower 64

(Figs. 3a and 8) rotatably mounted on a shaft 65 below the hopper H, which cam follower cooperates with a cam 66 mounted on a drive shaft 67 in the card feed clutch and cam assembly 46. Cam follower 64 is urged against its cam 66 by a spring 68 acting upon the arm 62.

The cards are inserted into the hopper H between a pressure plate 69 (Figs. 4 and 5) and the platform 52. The pressure plate 69 is coupled to a pantograph-like device 70 which exerts constant spring pressure tending to urge the plate 69 toward the platform 52. The plate 69 can be retracted manually away from the platform 52 to insert new cards in the hopper H, and it is also retracted automatically by the machine at intervals, so that the operator need employ only one hand for loading the hopper. Referring to Figs. 4 and 8, the pressure plate 69 has a small tail or extension 71 which extends through an opening in the bottom of the hopper H and is engageable by an arm 72 mounted on a rock shaft 73 (see also Figs. 3 and 3a) positioned below the hopper H. The shaft 73 has an arm 74 which is pivotally connected by a link 75 to a cam follower 76 (Figs. 3a and 8) cooperating with a cam 77 of the card feed clutch and cam assembly 46. A spring 78 attached to arm 74 and anchored to the frame urges cam follower 76 against its cam 77. Normally the arm 72 is positioned so as to arrest the pressure plate 69 a short distance away from the card platform 52. As a card is about to be fed, the arm 72 is swung to release the pressure plate 69 and allow it to contact the card or cards under the urging of the pantograph device 70, thus insuring proper contact of the cards with the pickers.

A shutter 79 (Figs. 3 and 6) extends into the exit slit 50 of the hopper H adjacent to the throat members 60 and 61. This shutter 79 is slidably supported by the hopper H and is reciprocated in timed relationship with the feeding of the cards. When a card has been fed into the reading station, the shutter 79 closes to prevent the entrance of any further cards from the hopper H. Sometimes an operator will insert new cards carelessly into the hopper, causing them to rebound or be pushed sideward. The shutter 79 keeps such cards from entering the reading station prematurely. For actuating the shutter 79, there are provided arms 80 and 81 (Figs. 3, 6 and 7) mounted on a rock shaft 82 and having fingers 83 and 84 extending into apertures in the shutter 79. The arm 80 has a cam edge with a recess in which a roller 85 normally seats. The roller 85 is carried by a rocker arm 86 on the shaft 58 which actuates the card pickers. As the shaft 58 is rocked to feed a card from the hopper H, a roller 85 cams the arms 80 and with it the arm 81, thereby moving the shutter 79 into its open position. As the card pickers are restored, the roller 85 moves into its recess and permits the arms 80 and 81 to restore the shutter 79.

*Card reading station*

The card reading station R (Figs. 2, 5 and 6) is defined by the contact plate assembly 87 (Figs. 6, 9, 11 and 16) which is attached to a supporting framework comprising a pair of bearing plates 88 and 89 (Figs. 3 and 9) held in spaced relationship by an upright structure 90. The lower end of the structure 90 has hinge members 91 which cooperate with hinge members 92 secured to the base plate 43. The center of the hinge afforded by the members 91 and 92 coincides with the center of the shaft 41, so that the framework 90 which supports the contact plate 87 can be swung about the shaft 41 (Fig. 9), causing the contact plate 87 to separate from the associated stationary structure at the reading station (as shown in Fig. 17) when one desires to inspect the interior of the reading station. Normally the framework 90 is held in the position shown in Fig. 9 by a latch 93 on the plate 88 which engages a projection on a fixed plate 94 that is connected by columns 95 (Figs. 6, 9 and 10) to the base plate 43.

The plates 88 and 89 have bearings in which are journaled shafts 96 and 97 that respectively carry one roller of each pair of card feeding rollers 98 and 99 (Figs. 3, 6 and 9). The shafts 96 and 97 are coupled by spur gears 100 (Figs. 5 and 9) to companion shafts 101 that carry the companion card feeding rollers 98 and 99. The shafts 101 are journaled at their lower ends in bearings afforded in the base plate 43, and at their upper ends they are journaled in slides 102 (Figs. 5 and 9) mounted on the plate 94, enabling the mating rollers 98 and 99 to yield resiliently when cards are fed between them.

The roller shafts 96 and 97 are spaced a distance slightly exceeding the width of a card, so that a card may be held stationary at the reading station without being subjected to the action of these feeding rollers. In this position of rest, the card C is supported between the contact plate 87 and a set of parallel rods 103 (Figs. 6 and 9). The lower edge of the card is supported by a dielectric block 104 (Fig. 9) on the base plate 43. The lower ends of the rods 103 are embedded in the dielectric block 104, and the upper ends of these rods are similarly embedded in a dielectric block 285 secured to the plate 94.

Each card is registered at the reading station by fingers 105 and 106 (Figs. 6 and 25), and these fingers also serve to push the card along its path from the reading station R to the eject compartment or stacker box S, as will be explained subsequently. The fingers 105 are pivotally mounted on structures 107 (Figs. 3 and 6) which are rotatably supported by the roller shaft 96. Small springs (not shown) urge the fingers 105 into positions for intercepting or pushing an edge of a card, and they also permit the fingers 105 to yield when these fingers contact the body of a card during their restoration. The rotatable structures 107 are connected by links 108 to arms 109 on a rock shaft 110 (Figs. 3, 3a and 8). The shaft 110, as shown best in Fig. 8, has an arm 111 connected by a flexible link 112 to a cam follower 113 pivotally supported by the shaft 65. The follower 113 cooperates with a cam 114 in the card feed clutch and cam assembly 46, which cam controls the movement of the registering fingers 105.

In similar fashion the registering fingers 106 (Figs. 6 and 25) are pivotally mounted on the roller shaft 97 and are connected to the rock shaft 115 which, as shown in Fig. 8, is connected to a cam follower 116 that cooperates with a cam 117 in the card feed clutch and cam assembly 46, whereby the movements of the registering fingers 106 are controlled.

*Brush carriage*

As mentioned previously, cards are read while they are being held stationary at the card reading station R, during which time a set of brushes 118 (Figs. 6, 9 and 11) is caused to travel lengthwise over the card for sensing the card columns in sequence. The brushes 118 are carried by a brush carriage 119 (Figs. 6, 9, 10, 11 and 12) which is mounted on a worm shaft 120 for reciprocatory up-and-down movement. Shaft 120 is journaled in plates 94 and 44 and is connected by spur gears 121 and 122 to the card read clutch assembly comprising the clutch portions 48 and 48a (Figs. 9, 29 and 30). Brush carriage 119 has a bifurcated extension 123, which, as shown in Figs. 6 and 10, straddles a bail shaft 124 rotatably supported by the frame of the machine in parallel relation to the worm shaft 120. As will be explained in detail presently, a screw-threaded connection is established between the carriage 119 and the shaft 120 for driving the carriage 119 downwardly, and this connection is interrupted when the downward travel of the carriage 119 is completed. For elevating the carriage 119, there is provided a spring-driven drum 125 (Figs. 3, 5 and 9) having a ribbon or tape 126 which is attached to a convenient point on the frame of the carriage 119, as shown in Fig. 11. The drum 125 returns the carriage 119 when the latter is uncoupled from the threads of the worm shaft 120, and a suitable governor (not shown) is provided for regulating the speed of the carriage return.

The brush carriage proper (Figs. 11, 12 and 13) consists of a frame structure 127 containing a tubular portion 128 which serves as a slide bearing adapted to ride along the outer surface of the threaded shaft 120. A worm gear 129 is rotatably mounted on the structure 127 and extends through an opening in the tubular member 128 to mesh with the worm thread of shaft 120. Unless prevented from doing so, the worm gear 129 may rotate freely as the carriage 119 is moved up and down along the shaft 120. Adjacent to the worm gear 129, and fastened to it, there is a ratchet wheel 130 which may be engaged by a pawl 132 rotatably mounted on studs 133 at the lower end of the frame structure 127. When the pawl 132 engages a tooth of the ratchet wheel 130, the wheel 130 and the worm gear 129 are prevented from rotating. Under these circumstances, the worm gear 129 acts as a nut on the worm shaft 120, causing the carriage 119 to be advanced downwardly by screw action when the shaft 120 is rotated. When the pawl 132 is disengaged from the ratchet wheel 130, the worm gear 129 is free to rotate, permitting the carriage 119 to be lifted by the spring-urged ribbon 126, with the worm gear 129 merely rolling over the threads of the worm shaft 120.

The pawl 132 has a U-shaped body and is connected by a spring 134 (Figs. 11 and 14) to a U-shaped brush operating member 135, which likewise is pivoted on the studs 133. The spring 134 tends to urge the pawl 132 against a stop on the operating member 135, and the two parts are capable of limited rotation together in this relationship. The operating member 135 also is connected by a spring 136 (Figs. 11 and 14) to a latch member 137 pivotally mounted on the frame 127 at 138. The members 135 and 137 respectively are provided with teeth or lugs 139 and 140 (Figs. 11 and 12) that are engageable with each other. When the member 135 is pulled away from the member 137, the spring 136 rotates the member 137 to bring the teeth 140 and 139 into the relationship shown in Fig. 11. Under these conditions the pawl 132 assumes a position where it locks the ratchet wheel 130, thereby causing the worm gear 129 to act as a nut on the shaft 120 in the manner just described.

When the carriage 119 is to be released for upward movement relative to the shaft 120, the latch 137 is tripped (in a manner explained presently) for releasing the operating member 135, whereupon these parts assume the relative positions thereof illustrated in Fig. 9. The latch 137 may be tripped in either of two ways. One of these involves the operation of the bail 141 (Figs. 6, 10 and 11) on the bail shaft 124. A lug 142 on the latch 137 is positioned for engagement with the bail 141 as shown in Fig. 6. When the bail 141 is rocked into engagement with the lug 142, the latch member 137 turns clockwise, as viewed in Fig. 11 causing the tooth 140 to move out of alignment with the tooth 149. Spring 136 thereupon pulls the operating member or lever 135 into the position shown in Figs. 9 and 14.

As an alternative means for tripping the latch 137 there is provided a tripping lever 143 (Figs. 11, 12 and 14) pivotally mounted on the carriage frame 127, which lever has a tooth-and-slot connection with the latch 137. The tripping lever 143 has an extension or lug 144 that engages a stationary finger 145 (Figs. 6, 10 and 14) on the base plate 43 when the carriage 119 reaches the limit of its downward travel. Engagement of the lug 144 with the finger 145 rotates the tripping lever 143 and causes it to move the latch 137 for freeing the lug 139 on the operating member 135 from the lug 140. The action in this case is similar to that described above; that is, the lug 140 moves out of alignment with the lug 139, enabling the member 135 to be rocked by the spring 136 into the position thereof shown in Figs. 9 and 14.

The bail 141 also is engageable with a lug 146 (Figs. 6, 11 and 12) on the operating member 135. When rotated in one direction, the bail 141 pushes against the lug 146 and rocks the lever 135. Through the medium of spring 136, the latch 137 is rocked and causes the tooth 140 thereon to move into alignment with the tooth 139 on the operating member 135. When the bail 141 is restored the member 135 is held latched up by the member 137 as shown in Fig. 11. When the bail 141 is moved in the opposite direction, it pushes against the lug 142 and trips the latch 137 for releasing the member 135. The bail 141 also has the function of momentarily arresting the carriage 119 in its lowermost position when the tripping lever 143 has been actuated to release the operating member 135. As shown in Fig. 14, the lower edge of the bail 141 can occupy a position where it blocks the lug 146 and thereby prevents the carriage 119 from being elevated until the bail shaft 124 is turned. These operations will be described in detail subsequently.

The operating member 135 on the brush carriage 119 supports the card reading brushes 118 (Figs. 6 and 11) by means of a suitable brush holder 147 having individual extensions for the various brushes. An insulating guard 148 supported by the holder 147 protects the brushes 118. The brushes 147 are electrically connected together in common and are adapted to press against the record card C (Fig. 11) for sensing the perforations therein when the operating member 135 is swung into its latched position shown in Fig. 11. The guard 148, which is yieldingly mounted on the brush holder 147, rests against the card C and slides along this card as the brushes 118 successively sense the card columns. When the member 135 is released, the brushes 118 are retracted from the contact plate 87 as indidicated in Fig. 9. When the brushes 118 are retracted, they are entirely covered by the guard 148. The guide rods 103 between which the brushes 118 extend are insulated from the frame of the machine, as noted above.

The brush carriage 119 also supports brushes 150 (Figs. 11 and 18) that are adapted to wipe over the surface of an emitter plug board 151 (described hereinafter) as the brush carriage 119 descends. The brushes 150 are carried by a dielectric supporting member 152 (Figs. 11 and 13) pivotally mounted on the frame of the carriage 119. A pin 153 (Fig. 13) on the lower end of the brush supporting member 152 is received within a bifurcation in the operating member 135, the arrangement being such that the brushes 150 are moved toward and away from the emitter board 151 in unison with the movements of the reading brushes 118 toward and away from the contact plate 87 and the card C adjacent thereto.

The bail shaft 124 is actuated by a mechanism shown in Fig. 34 and also appearing partially in Figs. 3a and 8. A rocker arm 154 on the shaft 124 is connected by a link or connecting rod 155 to a cam follower 156 on the shaft 65, which follower cooperates with a cam 157 on the cam shaft 67 in the clutch and cam assembly 46. A spring 158 attached to the arm 154 urges the follower 156 into cooperation with the cam 157. As the cam 157 rotates, the bail shaft 124 is caused to oscillate in an obvious manner.

*Brush carriage tab mechanism*

Means for releasing the brush carriage 119 to the action of its restoring means have been described. The carriage, when released, may return to its foremost initial position or it may be selectively arrested at a desired intermediate location. For this purpose there has been provided a tab mechanism for intercepting and stopping the carriage on its return trip at one or more locations. Referring to Figs. 6, 10 and 19, a notched, removable tab bar 160 is fastened by ears 161 (Fig. 22) to a rod 162 which is held in a fixed position by brackets 163 and 164 respectively anchored to the column 95 and to the base plate 43. The two ears 161 partially embrace the rod 162, permitting the tab bar 160 to slide up and down along the rod 162, as well as permitting the tab bar 160 to swing about the rod 162 as an axis. Tab stops 172 (two forms of which are illustrated in Figs. 23 and 24) may be placed on the tab bar 160 to cooperate with a stop arm or detent 174 (Figs. 10 and 13) on the carriage 119, for selectively arresting the carriage 119. These devices will be referred to again presently.

Normally the tab bar 160 is held in its lowermost position, indicated by full lines in Fig. 10. As shown in Fig. 10a, a latch mechanism 165 mounted on the under side of the top plate 94 has a protruding latch portion 166 that bears down upon the upper ear 161 supporting the tab bar 160. The latch 166 is pivotally mounted upon a shaft 168 and has an insulated extension 170 engaging a spring on the contact assembly 169 (Figs. 5, 10 and 10a). When the stop arm 174 of the brush carriage 119 strikes against a tab stop 172 during the trip of the carriage 119, the tab bar 160 is shifted upwardly a slight distance into the position indicated by broken lines in Fig. 10. This causes the latch 166 (Fig. 10a) to be rotated until an extension 178 thereof engages the bracket 179 on which the latch mechanism 165 is mounted. Such action causes the extension 170 to close the contacts 169. If the contacts fail to close within a predetermined time, the machine is prevented from initiating a subsequent cycle of operation. This will be explained more fully in a subsequent part of the description.

A hand lever 167 extending from the latch mechanism 165 (Fig. 10a) enables the arm 170 to be moved out of the way when a tab bar is being inserted.

The contacts 169 may be closed also by direct engagement of the carriage 119 with the extension 170 when the carriage 119 reaches the upper limit of its travel. This will be the case when the use of a tab bar is not required.

It is contemplated that the tab bar 160 may assume any one of three angular positions thereof, as indicated respectively in Figs. 6, 19 and 20. With the type of tab stop 172 shown in Fig. 23 (the position of which may be reversed in order to reverse the position of the stop tooth or lug 173 thereof) the stop arm 174 on the carriage 119 will be caught by a tab stop 172 when the tab bar 160 is in one of its two extreme positions, respectively illustrated in Figs. 19 and 20. When the tab bar 160 is in its center position, shown in Fig. 6, the stop arm 174 will clear the teeth 173, enabling the brush carriage 119 to be fully restored into its uppermost position. With the form of tab stop shown in Fig. 24, the brush carriage will be arrested when the tab bar 160 is in its center position, and will clear the tab stop when the tab bar 160 is in either of its two extreme positions. This three-position tabbing arrangement enables the brush carriage to be arrested at either of two intermediate levels before returning to its uppermost position, the locations of these intermediate levels being determined by the settings of the tab stops 172 on the tab bar 160.

The brush carriage stop arm 174 (Figs. 10 and 13) is yieldingly mounted on the side of the brush carriage 119, where it is held by two shouldered studs 175 and 176. Stud 175 serves as a fulcrum while stud 176 serves as a spacing retainer affording a limited amount of movement of stop arm 174 to compress a spring blade 177 interposed between the arm 174 and the brush carriage frame. The yielding property of the stop arm 174 permits it to pass by the tab stops 172 while the carriage 119 is moving downwardly. Once having passed by a tab stop 172, the stop arm 174 will snap back into a position where it can arrest any subsequent upward movement of the carriage 119 by striking the stop 172, except for the residual motion due to the slight lifting of the tab bar 160 as described above. The spring pressure of the restoring drum 125 (Fig. 5) is sufficient to overcome the lesser opposing pressure of the contact assembly 169 acting upon the tab bar 160 through the latch mechanism 165.

For moving the tab bar 160 into its different angular positions about the rod 162, there is provided a four-lobed cam 180 (Fig. 19) which is part of the tab bar clutch assembly 49, also shown in Figs. 10 and 21. The cam 180 is rotatably mounted upon a stub shaft 181 and is associated with a cam follower slide 183. The slide 183 is confined to linear movement by the shaft 181 and the rod 162 which respectively are received in the bifurcated ends of the slide 183. A spring 184 acting upon the slide 183 urges a roller 185 on this slide against cam 180. A pin 186 on the slide 183 is received in a slot 187 afforded in a small bell crank 188 pivotally mounted on the rod 162. The bell crank 188 has a second slot 189 that receives an extension 190 (Figs. 19 and 10) at the lower end of the tab bar 160. The cam 180 has four different positions in which it may rest. In one of these positions, shown in Fig. 19, a high point 191 on the cam 180 engages the roller 185 and forces the tab bar 160 into one of its extreme positions. There are two intermediate points 192 on the cam 180, and when the roller 185 is engaged with either of these, the tab bar 160 occupies its center position as indicated in Fig. 6. When the roller 185 is bearing against a low point 193 on the cam 180, the tab bar 160 occupies the other of its extreme positions as indicated in Fig. 20.

Secured on the shaft 181 is a gear 194 (Figs. 10 and 19) that meshes with a gear 195 on the shaft 67. As will be explained presently, the shaft 67 is constantly driven while the machine is in operation.

Referring to Figs. 6, 10, 19 and 21, the tab bar clutch assembly 49 includes a notched registering disc 196 secured to the four-lobed cam 180 and engaging a spring-urged detent 197. A clutch dog 199 (Fig. 21) having an arm 200 formed with a clutch tooth 201 is rotatably mounted on a stud 198 carried by the registering disc 196, and the clutch tooth 201 is adapted to cooperate with a notched hub 202 secured to the shaft 181. A spring 203 anchored to the registering cam 196 urges the clutch dog 199 in a direction to engage the tooth 201 thereon with the hub 202, but this movement may be resisted by a pin or stud 205 secured to a four-lobed spider 206 on the shaft 181, which stud engages an arm 204 of the dog 199. The spider 206 is connected by springs 209 to the registering cam 196. A tab bar clutch magnet 207 (Figs. 6 and 19) has an associated armature 208 (Figs. 19 and 21) that is positioned to engage a lobe of the spider 206 when the magnet 207 is in a deenergized condition. Under these circumstances the pin 205 on the spider 206 arrests the arm 204 of the clutch dog 199 and thereby causes the tooth 201 to be held clear of the notched hub 202. Backlash of the registering disc 196 is prevented by the detent 197 (Fig. 19) which seats in one of the four notches afforded in the edge of the disc 196.

When the clutch magnet 207 is energized, the armature 208 is withdrawn from engagement with the spider 206 and thereupon the spider 206 is permitted to shift a few degrees under the influence of the springs 209, thus releasing the clutch dog 199 so that the tooth 201 thereon is drawn into engagement with the notched hub 202. When this is accomplished, the registering disc 196, spider 206 and the four-lobed operating cam 180 commence to rotate with the hub 202. The energization of the clutch magnet 207 is only momentary, so that the armature 208 is instantly released to arrest the next lobe of the spider 206 at a time 90 degrees later in the rotation of the cam 180. Hence, for each energization of the clutch magnet 207, the tab bar control cam assembly is advanced a quarter of a revolution. When the spider 206 is stopped by the armature 208, the registering cam 196 continues to rotate for a slight distance, stretching the springs 209, until the clutch dog 199 is forced out of engagement with the driving hub 202 by the stud 205 (Fig. 21), at which time the detent 197 moves into one of the notches in the registering disc 196. The various parts therefor are held in the positions thereof illustrated in Fig. 21, until a subsequent energization of the clutch magnet 207.

*Mechanisms controlling card feed and brush operation*

The card feed clutch and cam assembly 46 (Figs. 3a, 26 and 28) and the brush control clutch and cam assembly 47 (Figs. 3a, 26 and 27) are mounted upon the drive shaft 67, which has a worm gear 210 (Figs. 3a and 28) engaging a worm on the main drive shaft 41. Shaft 67 is journaled in suitable bearings afforded in the frame plates 43, 44 and 94 (Figs. 3 and 3a). The assembly 46 contains a cam body 211 (Fig. 26) rotatably mounted on the shaft 67 and including the following cams: picker knife cam 66, card register cam 114, card ejector cam 117, pressure plate cam 77, and registering cam 212 (see also Figs. 8 and 28). The assembly 47 includes a cam body 213, which contains the brush control cam 157 and a registering cam 214 (see Figs. 26 and 27).

The clutch in the brush control assembly 47 is shown best in Fig. 27. This clutch has two stop positions (1) a normal one corresponding to the condition of the brush carriage 119 when it is latched up to be driven by the screw 120, with the brushes in their reading positions (see Fig. 11), and (2) a position 90° before the first-mentioned position, corresponding to a condition when the brush carriage 119 is not engaged with the screw 120 and the brushes are retracted from their reading positions (see Fig. 9). The cam body 213 assumes one or the other of these two positions when at rest, depending upon the time in the card feed cycle when the clutch brush control is operated.

The registering disc 214 in the cam body 213 (Fig. 27) carries a stud 215 on which a clutch dog 216 is pivotally mounted. The dog 216 has a tooth 217 adapted to seat in a corresponding recess in the notched driving hub 218 secured to the shaft 67. A spring 219 anchored by the cam 214 tends to urge the dog 217 toward the hub 218. An arm 220 of the dog 216 extending radially from the shaft 67 has a stud 221 that cooperates with a spider 222 rotatably mounted on the shaft 67. When the brush control magnet 223 is energized, the dog tooth 217 is permitted to seat in the notched hub 218, and the cam body 213 rotates with the drive shaft 67. When the clutch magnet 223 is deenergized, an interposer 224 associated with the armature of this magnet is spring-urged into a position to engage the spider 222 and stop the rotation thereof. The disc 214 and dog 216 continue rotating with the shaft 67 until the stud 221 on the dog 216 encounters the spider 222 and causes the dog 216 to pivot until the dog tooth 217 thereof is withdrawn from the driving hub 218. The spider 222 has two arms spaced 90° apart, either of which may engage the interposer 224, depending upon the time at which the magnet 223 is deenergized. A spring-urged detent 225 cooperating with the registering disc 214 seats in one of the two notches in the disc 214 to prevent reverse rotation of the cam body 211 when the same is disengaged from the drive shaft 67.

As described hereinabove, the cam 157, in rotating, operates the mechanism illustrated in Fig. 34 which actuates the brush control bail 141 (Figs. 6, 9 and 10). When the cam follower 156 rides onto the low portion of the cam 157 the bail 141 is moved in a direction such that it presses against the ear 142 of the latch 137 (Figs. 11 and 12), thereby tripping the latch and retracting the sensing brushes on the carriage 119 into their disengaged positions. Fig. 9 illustrates the relative positions of the brush carriage parts when the latch 137 is tripped. As explained above, the brush carriage 119 is uncoupled from the screw 120 when the brushes are retracted. When the cam follower 156 rides onto the high point of the cam 157, the bail 141 is moved in the opposite direction, engaging the ear 146 and causing the brush operating member 135 to be latched up by the latch 137, as shown in Fig. 11. This brings the brushes 118 and 150 respectively back into engagement with a card C at the reading station and with the emitter plugboard 151 and also couples the carriage 119 to the screw 120.

The cam body 211 in the card feed clutch and cam assembly 46 has a registering disc 212 (Figs. 26 and 28) with a single notch that is engageable by a spring-urged detent 227 when the cam body 211 is in its rest position. A clutch dog 228 pivotally mounted on a stud 229 carried by the cam 212 has a tooth 230 cooperable with a notched hub 231 secured to the drive shaft 67. When the card feed clutch magnet 232 is energized, a spring 233 anchored on the cam 212 urges the tooth 230 into its cooperating recess in the hub 231, and the cam body 211 thereupon rotates with the drive shaft 67. Toward the end of a single revolution, the magnet 232 is deenergized, in a manner subsequently explained, and an interposer 234 associated with the armature of this magnet is positioned to engage a radial arm 235 of the clutch dog 228. The cam body 211 rotates until the clutch tooth 230 is withdrawn from the notch in the hub 231, whereupon the cam body 211 comes to rest and is held against reverse rotation by the detent 227.

Figure 25:
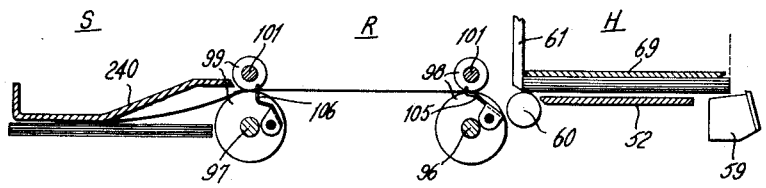
Figure 25A:
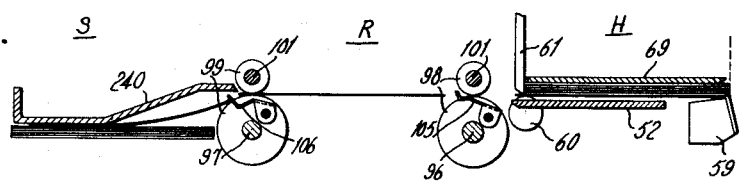
Figure 25B:
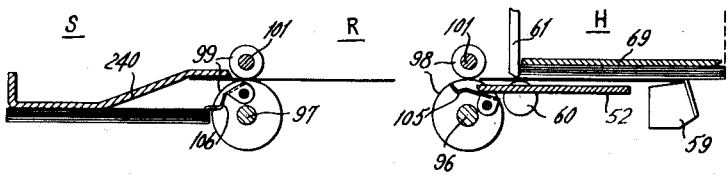
Figure 25C:
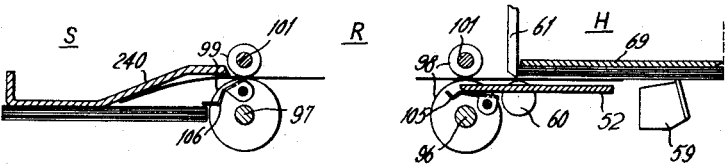
Figure 25D:
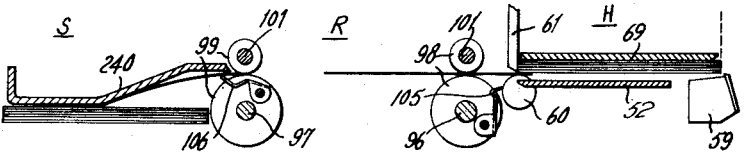

When the single-revolution clutch in the card feed and clutch assembly 46 is operated, there results a sequence of operations causing cards to be fed and ejected as diagrammatically illustrated in Figs. 25 to 25d, inclusive. Assuming that the process of feeding the cards has been in progress for a number of cycles, there will be, at the zero point of a machine cycle (Fig. 25), a card C1 in partially ejected position, a card C2 in reading position, and a card C3 at the front of the hopper H in position to be engaged by the pickers 59. The card C1 has passed slightly beyond the bite of the rollers 99 and is frictionally held between an angularly-bent guide member 240 and the stack of cards C in the stacker box S. As shown in Fig. 5, the cards in the stacker box S are clamped between the member 240 and a pressure plate 241 which is maintained under spring pressure by a pantograph device 242, similar to the one employed in the card hopper H. In the event that static electrical charges on the cards C in the stacker box S cause the cards to be repelled from each other, the stack cannot separate by a greater amount than is permitted by the card C1. The card C2 (Fig. 25) is held in reading position between the registering fingers 105 and 106 free of the rollers 98 and 99.

At a later point in the card feed cycle, illustrated in Fig. 25a, the registering fingers 105 and 106 are moved counterclockwise by their operating mechanisms (Fig. 6) which are actuated by the card register cam 114 and the card ejector cam 117 (Figs. 8 and 26). The finger 106 pushes against the trailing edge of the card C1 and forces this card into the stack of cards C in the eject box S, such movement being shown completed in Fig. 25b. This positive ejection of the card C1 and the subsequent clamping of the card stack by the finger 106, as shown in Figs. 25b and 25c, obviously prevent any gap from developing in the card stack due to static electricity. Hence, the card C2, which is now being ejected finds its proper place in the stack and is not inadvertently inserted into a wrong position as might otherwise occur. The card C2 is pushed by the finger 105 until its leading edge is caught in the grip of the rollers 99.

As the picker 59 moves forward (Figs. 25b and 25c) the card platform 52 advances, engages the finger 105, and causes the finger 105 to yield about its pivot point in order to clear the path for the advancing card C3. After the card C3 is firmly gripped by the feeding rollers 98, the picker 59 together with the card platform 52 and registering fingers 105 are restored (Fig. 25d). The yieldable mounting of the finger 105 enables this finger to move past the card C3 in its return motion. The eject finger 106, as shown in Fig. 25a, pushes the card C1 out of the way of the newly ejected card C2, then holds the card C1 against the stack as shown in Figs. 25b and 25c while the card C2 is being ejected by the rollers 99. As the card C2 moves out of the bite of the rollers 99, its leading edge is frictionally clamped between the guiding member 240 and the card stack C, while the trailing edge rests lightly upon the rollers 99. As the eject finger 106 is restored, it contacts the card C2 and yields as shown in Fig. 25d. Further restoring movement of the finger 106 brings it past the trailing edge of the card C2, whereupon the finger 106 snaps into the position shown in Fig. 25 so that it can arrest the leading edge of the incoming card C3. The registering finger 106 then moves into the position thereof shown in Fig. 25 to hold the new card in reading position after the same has cleared the rollers 99.

When cards are being fed, the cam bodies 211 and 213 (Fig. 26) are caused to operate together by simultaneously engaging their associated clutches. The cam body 213 (that is to say the cam 157 therein) causes the reading brushes 118 to be retracted from the card in the reading station before the card starts to move toward the eject position, and delays the restoration of the brushes to their sensing positions until a new card has been advanced into the reading station. When a repeat reading operation is to be performed, the cam body 213 alone is operated. The cam 157 is so shaped that it causes the sensing brushes to be retracted before the brush carriage commences its upward movement, and restores the brushes to sensing position when the upward movement thereof is completed. No cards are fed while the cam body 211 is stationary.

*Mechanisms controlling normal advance and skipping movements of carriage*

When a card at the reading station is to be read, the brush carriage 119 is coupled to the worm shaft 120, which advances the brush carriage 119 in a downward direction for causing the card reading brushes to sweep over the successive columns of the card. The shaft 120 may be rotated at two different speeds, of which lower speed is for reading the card columns and the higher speed is for skipping card columns. When the shaft 120 is to be rotated at its lower speed, a card reading clutch assembly 48 (Figs. 9, 29 and 30) is rendered operative, and when the shaft 120 is to be turned at its higher speed, a skip clutch assembly 48a (Figs. 9, 30 and 31) is rendered operative, in addition to the read clutch.

Referring first to Figs. 29 and 30, the worm shaft 120 is connected by a spur gear 121 to a spur gear 122 rotatably mounted on a shaft 252 on which the clutch assemblies 48 (Figs. 29 and 30) and 48a (Figs. 30 and 31) are mounted. A gear 253 (Figs. 29, 30 and 32) rotatably mounted on the shaft 252 meshes with a gear 254 on a shaft 255. Shaft 255 carries a large gear 256 (Figs. 29, 30 and 31) that meshes with a small pinion 257 on a shaft 258. A spiral gear 259 on the shaft 258 is meshed with a spiral gear 260 on the main drive shaft 41. Thus, the main drive shaft 41 drives the gear 253 on the clutch shaft 252 through the medium of gears 254, 256, 257, 258, 259 and 260.

A ratchet 261 (Figs. 30 and 32) secured to the clutch shaft 252 is engaged by a pawl 262 which is mounted on the lower face of the gear 253. Normally the gear 253 drives the shaft 252 through the medium of the pawl 262 and the ratchet 261. During a skip operation (explained hereinafter) when the shaft 252 is rotating at a higher speed than the gear 253, the teeth of the ratchet 261 click past the tooth of the pawl 262. During a normal card reading operation the clutch shaft 252 rotates continuously at the slower of its two speeds. The gear 122 is stationary except when it is coupled by the read clutch 48 to the constantly rotating shaft 252. The read clutch 48 is similar in its construction and operation to the tab bar clutch 49 which has been described above in connection with Fig. 21. Briefly, the read clutch 48 (Fig. 29) includes a notched hub 265 secured to the shaft 252, a notched registering disc 266 united to the gear 122 and rotatable on the shaft 252, a clutch dog 267 pivotally mounted on the disc 266 and engageable with the hub 265, and a spider 268 rotatable on the shaft 252 for controlling the clutch dog 267. The spider 268 has four lobes, any of which may be engaged by the interposer 269 on the armature of the read clutch magnet 270 when said magnet is in a deenergized condition. When the magnet 270 is energized, the spider 268 is released and enables the clutch dog 267 to engage the driving hub 265. This causes the registering disc 266 and gear 122 to rotate with the shaft 252, thereby driving the gear 121 and screw shaft 120 at the normal card reading speed. When the magnet 270 is deenergized, the clutch 48 becomes disengaged at the nearest quarter turn in the revolution of the spider 268. A spring-urged detent 271 seats in one of four notches in the registering disc 266 when the clutch is disengaged, preventing re-engagement of the clutch.

To drive the worm shaft 120 at its higher or skipping speed, the skip clutch 48a (Figs. 30 and 31) is operated, in addition to the read clutch 48. This clutch is similar to the read clutch just described. It includes a notched driving hub 275 and pawl 276 (Fig. 30), said pawl being mounted on a registering disc 277 and controlled by a spider 278, both of which are rotatably mounted on the shaft 252. In this case the notched hub 275 likewise is rotatably mounted on the shaft 252 and is united with a pinion 281 (Figs. 30 and 31) that meshes with the large gear 256 on the shaft 255. The spider 278 is controlled by the interposer 279 of a skip clutch magnet 280. When the magnet 280 is energized, the disc 277 is coupled to the hub 275 and pinion 281 by the pawl 276. Thereupon the disc 277 commences to rotate at a speed higher than the normal reading speed of the shaft 252. The disc 277 is connected by a pawl 282 to the ratchet 261 on the shaft 252. The pawl 282 therefore takes hold of the ratchet 261 and drives the shaft 252 at the higher skip speed. As mentioned previously, the teeth of the ratchet 261 click past the more slowly rotating pawl 262 (Fig. 32) when a skip operation is in progress. During a normal reading operation, the pawl 282 (Fig. 31) remains stationary, and the teeth of the ratchet 261 click past the pawl 282.

Contact elements at reading station

As described above, the reading station R (Figs. 6 and 9) has a contact plate 87 against which a card C is positioned to be read by the brushes 118 on the brush carriage 119 as the latter travels downward along the screw shaft 120. Normally the contact plate 87 is positioned adjacent to the guide rods 103, which are fixed at their upper ends respectively to the two dielectric blocks 285 and 104 (Fig. 9). The contact plate 87 is supported by the hinged structure 90, which can be swung away from the stationary rods 103. Fig. 17 indicates the extent to which the plate 87 can be separated from the rods 103 when the structure 90 is swung open. The structure 90 is swung into its open position whenever one desires to inspect the interior of the reading station or to dislodge a card which may have become caught there. Normally the structure 90 is closed, with the latch 93 thereon engaging a suitable projection on the frame plate 94, as shown in Fig. 9.

The insulating block 285 (Figs. 17 and 5) supported by the plate 94 has embedded in it a series of contact elements (twelve in the present instance), one for each index position in a card column. Each of these contact devices has a pair of interconnected plughubs or sockets 286 into which the terminals of electric conductors may be plugged for electrical connection to an individual bent contact spring 287 that extends downwardly from the block 285. The contact springs 287 respectively are aligned with conductive strips 288 (Fig. 16) that are imprinted on a sheet of insulation 289 which is part of the contact plate structure 87. The insulating sheet 289 is supported by a metal backing plate 290 included in the structure 87.

When the hinged structure 90 (Figs. 6 and 17) is closed, as shown in Fig. 9, the conducting strips 288 (Fig. 16) are brought into engagement with the corresponding contact springs 287, thus becoming electrically connected to the pairs of plughubs 286 (Figs. 17 and 5). Each of the conducting strips 288 is aligned with all of the corresponding index points in the several card columns. Thus, for instance, there would be a strip 288 for the No. "1" index points, another strip 288 for the No. "2" index points, and so on. When a reading brush 118 encounters a perforation in the card C, such brush extends through the perforation and makes contact with a conducting strip 288, thus completing a circuit path from the brush common to a pair of plughubs 286. These plughubs are respectively connected to appropriate recording devices, such as print magnets or punch controlling magnets, whereby such recording devices are operated in accordance with the data perforated in the card.

The emitter plugboard 151 (Figs. 6, 15, and 18) is inserted into grooves in a pair of dielectric members 294 (Fig. 6) fastened to the upright supports 95 of the machine frame. This plugboard 151 (Figs. 15 and 18) is of insulating material and has on its two faces identical arrangements of conducting strips which are printed onto the insulating material. Only one side of the board 151 is used at a time, and if the printed conductors become too worn for use on one side, the plugboard 151 is reversed so that the other side thereof may be utilized. A handle or grip portion 295 is provided at the upper end of the board 151 to facilitate the handling thereof.

A conducting strip 296 (Fig. 18) extends longitudinally on the plugboard 151 near the middle thereof. This strip 296 is aligned with a brush 150a in the brush assembly 150 supported by the brush carriage 119 (Fig. 11). The brush 150a is not electrically connected to the other brushes 150b, 150c and 150d in the brush assembly 150, but instead is connected electrically with the card sensing brushes 118, so that when the two sets of brushes are in their sensing positions, with brush 150a contacting the strip 296, a circuit path is established from strip 296 through the brush 150a to the brushes 118. Near the bottom of the plugboard 151 the conductor 296 is connected electrically by the conductor 297 to a printed contact 298 positioned on the plugboard 151 near one longitudinal edge thereof.

Near the other longitudinal edge of plugboard 151 there is located a printed contact 300 which is connected by a conductor 301 and a longitudinally extending conductive strip 302 that parallels the strip 296. The strip 302 is engaged by the sensing brush 150b when the brushes 150 are in their sensing position, and this brush 150b is connected electrically to the brushes 150c and 150d positioned on either side thereof. The brush 150c is adapted to cooperate successively with a series of printed contacts 303 which are spaced longitudinally on the plugboard 151, while the brush 150d likewise is adapted to cooperate successively with another series of printed contacts 303 spaced longitudinally on plugboard 151. The contacts 303 in each series correspond respectively to alternate columns of the record card which is being read. Thus, the left-hand contacts 303 (Fig. 18) pertain respectively to the odd-numbered columns 1—3—5—7, etc.; whereas the right-hand contacts 303 correspond respectively to the even-numbered columns 2—4—6, etc. The brush 150c is effectively spaced one-half a column ahead of the brush 150d in the direction of carriage travel, and the two sets of contacts 303 are laterally aligned with each other, as shown in Fig. 18. Therefore, as the brush carriage 119 descends, the brush 150c first encounters the number "1" column contact 303, and while the brush 150c is moving off of this contact, the brush 150d is moving onto the contact 303 corresponding to the number "2" column. This is repeated as the brushes 150 travel along the emitter plugboard 151, with the brushes 150c and 150d being alternately brought into and out of engagement with the column-representing contacts 303 in synchronism with the sensing of the card columns by the reading brushes 118.

A series of printed contacts 304 is positioned along one longitudinal edge of the plugboard 151 in alignment with the series of contacts 303 which correspond to the odd-numbered card columns. Similarly, another series of printed contacts 304 is positioned along the other longitudinal edge of the plugboard 151 in alignment with the series of contacts 303 corresponding to the even-numbered card columns. Plughubs or contact points afforded by hollow rivets 305 (Figs. 15 and 18) fastened in the plugboard 151 are located on the contact strips 303. In similar fashion the contact strips 304 are provided with plughubs or contact points 306. Suitable jumpers (not shown) having terminals which are receivable in the hubs 305 and 306 can be employed to interconnect any of the contacts 303 with any of the contacts 304.

The column emitter element including the plugboard 151 and the sensing brushes 150 is employed to furnish signal impulses for initiating certain functions of the machine when selected card columns are being sensed by the reading brushes 118. For the purpose of establishing the necessary control circuits involved in the performance of said machine functions, and also to energize the sensing brushes 118 and 150, the insulating members 294 in which the edges of the plugboard 151 are received are equipped with clips 310 (Figs. 6, 9 and 15) which respectively grip the contacts 304, 298 and 300 (Fig. 18) on the plugboard 151 when the board 151 is inserted into these channels. The clips 310 have sockets or hubs 311 into which the plug ends of conductors (not shown) may be inserted for establishing the necessary electrical connections to the contact elements on the emitter plugboard 151. The contact clips which engage the contacts 298 and 300 carry the current which is furnished to the brushes 118 and 150 by way of the contact strips 296 and 302. The clips that cooperate with the contacts 304 carry the current flowing through the various control circuits that are established when selected card columns are being sensed. In describing the circuits of the machine hereinafter, it will be assumed that the various function circuits are plugged directly to the emitter hubs 305 (Fig. 18) since this, in effect, is what takes place electrically through the medium of the clips 310, contacts 304, hubs 306 and jumpers connecting the latter to the hubs 305.

*Program stepping switch*

The program stepping switch 315 (Figs. 3a and 33) is a power-driven element for progressively making circuit connections which determine the program of recording operations. Thus, for instance, it may be desired that information contained in certain card columns be recorded only by the No. 1 typewriter, whereas information in other card columns is to be recorded by both the No. 1 and No. 2 typewriters, and it may be desired also that the tape punch be operated at certain times and not at other times. The stepping switch 315 attends to these functions. The stepping switch can, of course, be utilized to program other machine functions as well.

The stepping switch 315 is supported by brackets 316 which depend from the lower frame plate 44 of the drive unit. The driving mechanism of the switch 315 includes a four-lobed cam 320 which is connected by gears 321 and 322 to the constantly rotating shaft 252 that transmits power to the read clutch assembly 48 described hereinabove. As shown best in Fig. 33, the cam 320 has a two-part cam follower 323 on which is pivotally mounted an escapement pawl 324 cooperating with a ratchet wheel 325, to which the switch wiper arms 326 are secured. When the follower 323 is following the cam 320, the pawl 324 acting upon the ratchet wheel 325 causes the switch arms 326 to be advanced rotatably in step-by-step fashion.

The illustrated switch mechanism 315 has six program levels, each of which has its own set of wiper arms as 326 cooperating with printed contacts arranged on an insulating commutator plate 327. The various pairs of wiper arms 326 in the several program levels are insulated from each other, and all are actuated in unison by the pawl 324. The printed contacts may be arranged in accordance with any suitable design. In the example shown in Fig. 33 there is a common contact 328 which is connected successively with individual contacts 329 by one or the other of the bridging wiper arms 326 as the stepping switch 315 operates. In order to economize space, successive contacts 329 may be arranged alternately on the two sides of the plate 327, and each of the wiper arms 326 may be divided into two portions, each bridging the contacts 328 and 329 on one side of the plate 327.

In order to establish connections with external circuits, the plugging units 330 (Fig. 3a) and 331 (Figs. 3a and 33) are provided, each of these plugging units consisting essentially of a dielectric block having resilient contact clips mounted therein for engaging the various printed contacts on the commutator plates 327. In addition to the printed contacts just described, there may be additional printed conductors 332 (Fig. 33) extending across the plates 327 serving merely as connectors from one edge of the plate 327 to the opposite edge thereof. All of the printed conductors 329 and 332 are engageable individually with contact clips 333 (Figs. 33 and 3a) in the plugging unit 331. The plugging unit 330 contains individual contact clips 334 which are respectively adapted to engage the printed conductors 328 and 332. Plugging connections can be made to the various contact elements of the stepping switch 315 by inserting the plugged terminals of external circuit conductors into the clips 333 or 334.

The program switch unit 315 has an electromagnet 336 which operates an interposer 337. Normally, when the magnet 336 is deenergized, a spring 338 acting upon the armature 339 of this magnet forces the interposer 337 into the path of a lug 340 on the cam follower 323. This prevents the cam follower 323 from following the contour of the rotating cam 320; hence the pawl 324 remains stationary and does not advance the ratchet wheel 325. When the electromagnet is energized, however, the interposer 337 is moved away from the lug 340, permitting the follower 323 to be reciprocated by the cam 320. Certain of the connectors 332 are used to establish electric connections to the magnet 336 by means of wires 343 and contact springs 344 mounted on a dielectric plug 345 adjacent to one of the commutator plates 327. The springs 344 electrically connect the wire leads 343 coming from the magnet 346 respectively to a pair of the connectors 332.

OPERATION

Typical functions of the machine will be explained with reference to the circuit diagrams in Figs. 36 and 37, and as a further aid to understanding the operation of the machine, there is presented in Fig. 35 a timing chart indicating the relative cyclic order in which the principal elements of the machine function. For convenience, the functions of these elements are represented on a common time base equal to the period of a complete card feed cycle, but all of the elements do not operate in the same cycle. Actually, the cycles in which cards are fed occur intermittently, and during the intervals when the card feed mechanisms are idle, the card reading apparatus functions. Moreover, each card reading cycle (one column) requires only one-fifth as much time as a card feeding cycle. These considerations, therefore, should be kept in mind when interpreting the timing chart.

Feeding, reading and ejecting of a card—Fig. 36

To start the operation of the machine, a start key 350 is closed. This prepares a circuit under the control of the circuit breaker CR10 from the positive side of the line over the start key 350 and the registration test magnet R202 to ground. The circuit breaker CR10 and other similar circuit breakers identified by the prefix "CR" are located on the constantly running shaft 67, Fig. 10. Through a yieldable coupling, registration test magnet R202 operates a test finger 353 (Figs. 3, 4, and 5) that is adapted to slide over the upper edge of the card or cards in the hopper H, at the exit slit 50, when the cards are properly positioned in the hopper. This causes the registration test contacts 354 to close. If, however, a card is only partially inserted into the hopper, the finger 353 will be blocked, and the contacts 354 will remain open.

Closure of the registration test contacts 354 completes a circuit through the pickup winding of a start relay R214 (Fig. 36), causing this relay to operate its several contacts. Closure of relay contact R214a completes a circuit through the hold winding of R214, contact R214a and a contact R49-1 of a relay R49, which latter contact is closed at the time. Operation of relay R214 causes the closure of its "b" and "c" contacts. Closure of contact R214b prepares a circuit under the control of the circuit breaker CR13 for operating the card feed clutch magnet 232. Magnet 232 energizes and causes its associated card feed clutch 46 to become engaged. As the card feed cam assembly 211 commences its rotation, a pair of contacts 355 (Figs. 8 and 36) operated by means of a cam follower associated with the disc 212, becomes closed and remains closed throughout a large portion of the card feed cycle. Closure of this contact 355 completes a circuit through the winding of a card feed timing relay R49.

As the card feed timing relay R49 energizes, it prepares a circuit from the circuit breaker CR12 (when closed) through a card lever contact 363 (which detects the presence of a card in the hopper), thence through relay contact R49-2 to the card lever relay R47 pickup coil. A holding circuit for relay R47 is established through CR14, relay contact R47-1 and hold coil of R47. An alternative holding circuit extends through relay contacts R49-3 and R47-1 to R47(H). The brush control cam body 213 (Fig. 26) includes the disc 214 which operates a pair of contacts 356 (Fig. 34) that are similar to the contacts 355 (Fig. 8) which are operated by the disc 212 in the card feed cam body 211, as previously described. As explained hereinabove, the cam body 213 has one position (hereinafter referred to as its 0-degree position) wherein it causes the reading brushes to be latched up for reading a card, and it has another position 90 degrees prior to the 0-degree position (hereinafter referred as its 270-degree position) wherein the brushes are retracted from their reading positions. The cam contact 356 is open when the cam body 213 is in its 270-degree (non reading) position, and closed when the cam body 213 is in its 0-degree or reading position. At the present time the contact 356 is open.

The contact 169 (Figs. 5, 10a and 36) is operated by the extension 170 of the latch 166, which can be engaged either by the carriage 119 directly or by the upward shifting of the tab bar 160. Hence the carriage 119 is now in its uppermost position, the contact 169 is closed. Hence a circuit is established through the contact 169, relay contact R47–3 and relay contact R215a through the brush control magnet 223. Magnet 223 operates, engaging the brush control clutch 47 and causing the cam body 213 to rotate 90 degrees into its 0-degree position. The sensing brushes 118 and 150 thereupon move into their reading positions, and the carriage 119 is coupled to the screw shaft 120. As yet, the shaft 120 has not commenced to rotate.

As the cam body 213 arrives at its 0-degree position the associated contact 356 closes, energizing the relay R215. Relay R215 opens its "a" contact, breaking the circuit to the brush control clutch magnet 223. Circuit breaker CR11 opens and deenergizes the start relay R214 which opens its "b" contact and prevents the re-energization of the clutch magnets 223 and 232 when a subsequent pulse issues through the circuit breaker CR13.

When circuit breaker CR4 opens, the interlock relay R45 drops out, causing the contact R45–2 to close. Circuit breaker CR5 then closes a circuit through R47–2, R45–2 and R217c to the read clutch magnet 270. Screw shaft 120 thereupon starts rotating, and the process of reading the card commences.

On the read clutch shaft 252 is a pair of cams 357 (Figs. 5 and 9) which operate a function signal circuit breaker 358 (Figs. 5 and 36) for emitting pulses in synchronism with the reading of the card columns by the brushes 118 (see timing chart, Fig. 35). When the first card column is reached, a circuit is completed through the circuit breakers 358, card lever R47–4, R45–4, R216c to the contact strip 296 on the emitter board 151. Through the emitter brush 150a, this pulse is applied to the reading brushes 118.

Assuming that a "4" hole is punched in the first card column, the conductor strip 288–4 receives battery from the corresponding one of the brushes 118, through the perforation, and this battery is extended through a conductor 359 to the recording magnet R120 corresponding to the numeral 4, energizing said magnet. The magnet 120 may be one of a series of magnets that control the operation of recording elements such as printing type members or punches for recording data characters consecutively on a sheet.

The process of reading the card columns is repeated as the brushes travel downwardly across the card, and the data is recorded character-by-character as the columns are sensed. If all of the columns are to be sensed, the carriage is permitted to travel until it reaches its lower limit, whereupon automatic tripping means (described above) takes effect to uncouple the carriage from the shaft.

It may be desired to interrupt the card reading operation before the carriage reaches the lower limit of its travel, and restore the carriage immediately to its initial position. Say, for example, that only one-half of the card columns are to be read (meaning the first 40 columns in the case of an 80-column card). Obviously, a waste of time would be involved if the sensing brushes had to travel the entire length of the card in each instance before the carriage were released. In view of this, the present machine incorporates provisions for returning the carriage automatically to its starting position after completing only a designated portion of its travel. One such means will be described now, and an alternative means will be explained subsequently in connection with the automatic tab operation.

The emitter plate 151 (Fig. 36) has a series of contacts or plughubs 305 respectively corresponding to the columns of the card that is being read. The emitter brush 150b contacting the emitter strip 302 is successively brought into electrical contact with the card column hubs 305. To stop the card reading at a particular column, the hub 305 corresponding to that column is connected through a plug connector 361 to an eject hub 360 connected to one side of the registration test magnet 202. When the emitter hub 305 corresponding to the last column is reached by the emitter brush 150b, the following circuit is established: circuit breaker 358, relay contacts 47–4, 45–4, 216a, strip 302, brush 150b, hub 305, connector 361 and hub 360 to the magnet R202. Magnet R202 thereupon energizes and closes the registration test contact 354, putting battery on the start relay R214. The brush control cam contact 356 is closed at this time. Hence the start relay R214 energizes to initiate a new card feed cycle.

At this time a circuit is established through CR13, R214b, R210a, R215a, to the brush control magnet 223. The brush control clutch 47 operates and moves the brush control cam 157 toward its 270-degree position. The brushes are retracted and the carriage is restored as a result of this.

When the carriage reaches its initial position, the interlock contact 169 (Fig. 36) is closed. Assuming that a card is being fed at this time, the card lever contact 363 is closed and R47 consequently is operated, closing R47–3. Magnet 223 therefore is re-energized, enabling the brush control cam 157 to move into its 0-degree position for dropping the brushes back into their reading positions. Reading of the second card follows in the manner previously explained.

*Column skip controlled by emitter—Fig. 36*

Means previously described are provided to permit the brush carriage 119 to advance at an accelerated speed for the purpose of skipping over a series of card columns in which no reading is desired and to another portion of the card where reading is to be resumed. Operation of column skip clutch magnet 280 will cause this skipping operation at any desired time by plug connecting a desired contact point 305 of the emitter plate 151 to the column skip relay R53, as indicated by the connection 365 (Fig. 36). Consequently, as brush carriage 119 advances and as the associated emitter brushes 150 reach that contact point 305, a pulse from function signal circuit breaker 358 will be sent over the closed "4" contact of the card lever relay R47 to the now closed "4" contact of interlock relay R45, thence over the now closed "a" contact of card skip interlock relay R216 to contact strip 302, thence over contacting brush 150b to the contact point 305 just mentioned, from there over the plug wire 365 to and over the pickup winding of column skip "On" relay R53 and thence to ground. Relay R53 is of the latch-up kind, having means to latch up the contact armature after it has been operated over its associated pickup winding. The latch in turn may be operated to unlatch the just mentioned armature by operating a trip magnet causing the latch to release the contact armature.

Because of the energization of the pickup coil of column skip "On" relay R53, contacts associated with this relay are now latched up in operated condition and will remain so until the trip coil of this relay is eventually operated to cause these contacts to return to their normal condition. Early in the read cycle a circuit breaker CR3 closes a circuit extending from battery over it to now closed contact "1" of column skip "On" relay R53, thence to and over the pickup coil of column skip control relay R217 and thence to ground. Because of closure of the associated contact 217b, current is applied to the hold coil of relay R217 over a circuit from battery over now closed contact "2" of column skip "On" relay R53 over the closed contacts "b" of column skip control relay R217, now closed, to and over the hold coil of the latter relay. Also, because of operation of relay R217, a circuit is completed from battery over now closed contact "d" of relay R217 to and over the pickup coil of column skip interlock relay R216 and thence to ground.

Upon operation of relay R216, closure of associated points R216b will apply current, controlled by circuit breaker CR2, to the hold coil of R216. The purpose of the latter arrangement is to provide a definite dropout time for relay R216 as determined by circuit breaker CR2 after R217 has been dropped. Due to operation of R216 and opening of its contacts R216c, the connection between contact strip 296 and function signal circuit breaker 358 is interrupted, thus preventing any reading of the card during the ensuing period of skipping.

Because of operation of relay R217, a circuit is closed from battery over now closed contacts "a" of relay R217, to skip clutch magnet 280 and thence to ground. A second circuit is also closed at this time because of operation of R217 as follows: From battery over now closed contact "c" of R217 to the read clutch magnet 270 and thence to ground. As a result, both the skip clutch and the read clutch are now operated. Because of mechanical means previously described, the brush carriage will advance at an accelerated speed. In order to insure coincidence of timing, the function signal circuit breaker is located on the shaft controlled by read and skip clutch, thus issuing function signal pulses at an accelerated rate corresponding to the accelerated speed of the shaft.

Skipping operation will continue until brush 150b hits a contact point 305 on the emitter plate 151 which has been plugged for the purpose of stopping the skip operation, such contact point being wired through a connector 367 (Fig. 36) to the trip coil of the column skip "On" relay R53. As a consequence, the function signal occurring at this time will energize the trip coil of relay R53 and thereby drop the contact armature of this relay. This action results in the opening of its associated points "1" and "2." Opening of the "2" point of column skip "On" relay R53 interrupts current to the hold winding of column skip control relay R217, resulting in opening its points which interrupt current to the pickup winding of column skip interlock relay R216. Relay R216 then will be deenergized when CR2 opens.

The deenergization of R217 opens its "a" and "c" points which interrupt current to the skip clutch magnet 280 and the read clutch magnet 270, respectively. Deenergization of skip clutch magnet 280 and read clutch magnet 270 allows these clutches to latch up in position to start the next read cycle at normal speed. Deenergization of column skip interlock relay R216 drops its "a" and "b" points. The circuit from function signal circuit breaker 215 to reading brush common 296 will again be completed through the closure of the "c" points of relay R216. Also the closure of "a" point of R216 will restore function signal impulses to column emitter common strip 302. When CR5 closes at 54°, a circuit will again be established as before through CR5 to and over points "2" of card lever relay R47, to and over points "2" of interlock relay R45 to and over "a" points of column skip control relay R217, now in normal position, to winding of read clutch magnet 270, thence to ground. Closure of this circuit will energize the read clutch magnet 270, causing the brush carriage 119 to advance and read the next column in the card, as before.

*Automatic tab operation—Fig. 36*

In order to explain this feature, it is assumed that a card contains three successive fields A, B, and C, which fields, however, are not to be read consecutively (A, B, C) but first field A, then field C, and finally field B. This requirement calls for an operation of the machine resulting in reading field A, then skipping across the card to the beginning of field C and after completing reading of field C, to release the brush carriage and let it return to the beginning of field B, then read field B and at the end of this field to cause the brush carriage to return to the initial position, that is, the beginning of field A, during an eject and feed cycle, so that consecutively fed cards may be read in similar fashion.

This process involves the operation of the tab bar 160 causing it to intercept the brush carriage 119 at the beginning of field B, after having been released upon completion of reading field C. Thereafter, tab bar 160 will have to be returned to its normal position, permitting return of the brush carriage 119 to the extreme uppermost position when released again.

This sequence of operation is prepared as follows. Emitter plate contact point 305 corresponding to the end of field A is plug-connected to the pickup coil of column skip "On" relay R53, as indicated by the connector 365 (Fig. 36). Emitter plate contact 305 corresponding to the column immediately preceding the beginning of field C is plug-connected to the trip coil of column skip "On" relay R53, as indicated by the connector 367. Emitter plate contact point 305 corresponding to the end of field C is plug-connected to a relay R210, as indicated by a connector 369. Reading brush contact strip 288-11 is connected by conductor 370 to registration test magnet R202 and reading brush contact strip 288-12 is connected by conductor 372 to tab bar clutch magnet 207. This latter arrangement permits operation of either of the magnets R202 and 207 by merely providing a hole in the card at a desired column position. In the present example, such holes are provided, namely a "12" hole at the beginning of field B and an "11" hole at the end of field B. In this operation it will be unnecessary to make a plugging connection 361 to the magnet R202, since the control is being effected through a card perforation.

Due to the above preparations, the operation of the apparatus will be as follows: After the card has been fed into reading position and reading has begun at the beginning of field A, in the manner previously described, emitter plate contact brush 150b will at the end of field A permit a function signal to reach pick-up coil of relay R53, causing skipping from this point on until emitter plate contact brush 150b reaches a contact point 305 corresponding to the column immediately preceding the first column of field C causing operation of the trip coil of R53 and thereby causing cessation of skipping and resumption of reading operation over field C. When arriving at the last column of field C, emitter plate contact brush 150b will contact the hub or point 305 corresponding to this column, and because of the previously prepared connection 369 will extend a function signal to and over the coil of relay R210 and thence to ground. This will cause the closure of transfer contacts "a" of this relay. The circuit then closed will extend battery over this contact and over contacts "a" of R215, closed at this time, to and over the brush control clutch magnet 223, thence to ground. At the same time, because of closure of contact "b" of relay 210, battery will be also extended over this contact to tab bar clutch magnet 207 and thence to ground.

Because of operation of tab bar clutch magnet 207 tab bar 160 will be turned into a position where a tab stop 172 inserted in a position corresponding to the first column of field B will be moved into the path of stop arm 166 on the brush carriage 119. Because of operation of brush control clutch magnet 223, the brush carriage 119 will be released, and will start to return to its initial position. However, since the aforesaid tab stop 172 has been moved into the path of arm 166, the carriage 119 will be arrested at a corresponding point instead of returning to its initial position. As arm 166 contacts tab stop 172, it communicates its motion to tab bar 160, causing it to be lifted along rod 162. This motion of the tab bar 160 is transmitted over arm 170 of the latch assembly 165, and the resulting rotation of the latch 166 will cause closure of brush control interlock contact 169. The resulting action is identical to that which would have occurred, had the brush carriage 119 returned to its extreme initial position, in which case it would have operated arm 170 directly.

Closure of contact 169 will initiate actions previously described and resulting in the resumption of card reading, field B being read in this instance. As the first column of field B is being read, the function signal then issuing will also pass into the reading contact strip 288–12 because of a corresponding hole having been punched into the card at this point. This pulse will be directed to the tab bar clutch magnet 207, causing the associated clutch 49 to operate and therewith turning the tab bar 160 into such a position that the tab stop 172 will not intercept the brush carriage 119 when the latter is released the next time.

When reading the last column of field B, the then issuing function signal will reach brush contact strip 288–11 because of a corresponding hole punched in the card at the last column of field B. This pulse will therefore be directed to the registration test magnet R202, over its coil and thence to ground. Operation of registration test magnet R202 will initiate a series of operations previously described, resulting in the ejection of the card just read and the feeding of a new card accompanied by the return of the brush carriage 119 to its extreme initial position. Upon completion of these operations, the reading of the newly fed card in a manner similar to that just described may be performed.

*Program control—Fig. 37*

The program stepping switch 315 (Figs. 3a, 33 and 37) has six levels, five of which are respectively allocated to separate programs A, B, C, D and E, and the sixth level is used for homing purposes. During the card feed cycle the switch 315 is returned to its home position. The feeding of a card operates the card lever 363 which, in a manner previously explained, results in the card reading brushes 118 and the emitter brushes 150 being latched into their reading positions, and also results in the brush carriage 119 being coupled to the screw shaft 120. When the program switch is in control of machine operations, there is a pause between the reading of the first card column and the reading of the next column, in order that the program switch can set up the necessary circuits for carrying out a program selected through a perforation in the first card column.

By way of example, it will be assumed that the first column of the card has a "1" perforation, signifying a particular type of card, such as a "head" card. Furthermore, it will be assumed that for this type of a card, program "D" will be followed, and that in accordance with this particular program, the No. 1 typewriter alone is operated to print the first character (represented in card column 2). In explaining the program control operation, the element which is being operated will first be stated, followed in parentheses ( ) by the circuit which is involved in causing that element to function. The sequence of operation is as follows:

(a) First program cycle.

Stepping magnet 336 (358, R47–4, R54–2, R215b, R45–3, 336).

Control column relay R59 pickup (358, R47–4, R54–2, R215b, R45–3, R218, R218a, R45–3, R54–3, R44–1, R43–1, R42–1, R41–1, program switch level No. 1 common, wiper, terminal No. 2, plugwire 374 to entry hub of distributor 375, rectifier, exit hub of distributor 375, plugwire 376, R59P coil).

Card read "On" relay R55 pickup (distributor 375, exit hub, plugwire 377, R55P coil).

Both of the relays R55 and R59 are of the latch type. Once these relays are picked up, they are mechanically latched in their operative conditions. To release such a relay, its trip coil must be energized. Relays of this type are well known in the art and hence their construction is not illustrated in detail herein.

Card read control relay R54 pickup (CR3, R55–1, R54P coil).

R54 hold (CR4, R54–1, R54H).

Read clutch magnet 270 (CR5, R47–2, R45–2, R55–2, R217a, magnet 270).

(b) First card read cycle.

It is assumed that the program will be selected through a perforation in the first card column. The No. 1 column emitter hub 305 is connected by a plugwire 378 to the "Program On— All Cards" hub 379. The following circuits are established:

Card read "On" relay R55 trip (CR8, R54–5, R45–4, R52–3, column emitter common 302, brush 150b, column No. 1 support 305, plugwire 378, R55–R).

Relay R55 is tripped and opens its contact R55–2, interrupting the circuit to the card read clutch magnet 270. Hence, the read clutch 48 is engaged for only one quarter of a revolution, at the end of which it is disengaged to introduce a pause in the card reading as noted above.

Relay R54 drops out when CR4 opens, and its contacts R54-2 and R54-3 close to allow the necessary pulse from circuit breaker 358 to reach the first program switch level and the stepping magnet 356.

Assuming a "1" hole to be present in column 1 of the card, the following circuits are completed in this card read cycle:

Relay R105 pickup (CR8, R54-5, R45-4, R52-4, reading brush common 296, No. 1 brush 118, No. 1 hole in card, No. 1 contact strip 288, R105P coil).

Relay R105 hold (CR6, R105-12, R105H coil).

Selector relay R23 pickup (CR6, R59-2, R105-1, plugwire 380, R23P coil). R23 is latched.

Control column relay R59 trip (CR6, R59-2, R45-6, R54-6, R59T coil).

Head card relay R58 pickup (CR6, R59-2, R105-1, plugwires 389 and 381, R58P coil).

(c) Second program cycle.

The program stepping switch 315 is in its No. 2 position. The No. 2 hub of the first program level (program A) is plugged to the "common" hub 382 of the selector relay R23, and the "transfer" hub 383 of this relay is plugged to a hub for picking up the program D relay R43. Both the pickup and trip coils of relay R43 are energized when the function signal from the circuit breaker 358 is transmitted, and are deenergized simultaneously when the signal pulse ends, causing the relay R43 (although it is a latch-type relay) to drop out. The operations are as follows:

Program stepping magnet 336 (circuit previously traced).

Program D relay R43 trip (from program A-2 switch contact, plugwire 384, hub 382, R23-1, hub 383, plugwire 385, to R43T coil, and through R49-6 to R43P coil).

(d) Third program cycle.

The program stepping switch 315 is in its No. 3 position. In this program cycle it is desired to engage the card read clutch 48 in order to read the second column of the card and to prepare circuits which will cause the information read to be printed on typewriter No. 1. These circuits are as follows:

Card read "On" relay R55 pickup (previously traced circuit to R44-1, R43-1, now in normal position, level No. 4 common, wiper, terminal No. 3, plugwire 386, entry hub of distributor 387, rectifier, exit hub of distributor 387, plugwire 388, R55P coil).

Typewriter No. 1 relay R89 pickup (exit hub of distributor 387, plugwire 389, R89P coil).

Relay R89 hold, and relays R92, 95 and 98 pickup (R49-1, R220b, R89-1, R89H coil and R92, 95 and 98 coils).

Card read control relay R54 pickup (previously traced circuit).

R54 hold (previously traced circuit).

Read clutch magnet 270 (previously traced circuit).

(e) Second card read cycle.

The card reading brushes now advance into column No. 2 position, and it is assumed that the character "J" (11 and 1 holes) is punched in this column. The following circuits are established for energizing the "J" print magnet of typewriter No. 1 to print the letter "J":

Relay R105 pickup and hold (previously traced circuits).

Relay R103 pickup (reading brush common 296, No. 11 brush, 11 hole in card, No. 11 strip 288, R103P coil).

Relay R103 hold (CR6, R103-6, R103H coil).

"J" print magnet (R59-1, R86-4, R103-3, R105-4, R89-11 "J" print magnet, CR7).

Head card relay R58 trip (CR11, R49-8, R58T coil).

During the normal reading of card columns, once the desired program has been selected, the program switch 315 may remain stationary (provided there is no change of program function) as the column reading progresses. On the other hand, if there is a change of program, the program switch 315 will advance the required number of steps in order to effect the necessary functions entailed in setting up the new program, while the card reading brushes remain stationary. When a column skip occurs, the program switch does not operate. The necessary correlations of program and reading functions are effected through suitable relay interlocks illustrated in the circuit diagrams.

Summarizing the operation of the program control means, the stepping switch 315 operates to prepare the machine for reading a card, to set up a selective program in response to information contained in the card, to change programs wherever necessary, and to supervise numerous other functional operations of the machine which are incidental to the reading and handling of the record cards. At each step position of the switch 315, certain functional operations of the machine are performed in accordance with the manner in which the program switch 315 is plugged. The setting up of a program usually involves the selection of one or more recording units (such as typewriter No. 1, typewriter No. 2 or the tape punch unit) for operation under card control. The program switch 315 and the card reading brush carriage 119 operate alternately, that is, the carriage 119 is stationary while the program switch 115 is advancing to set up the machine for a program of operations, and when the setting-up operation is completed, the carriage 119 then advances for causing the card columns to be read successively. Concurrently with the reading of the card columns, the column emitter 150 functions in the familiar manner to activate the column emitter contacts in sequence. The column emitter may also be used to control machine functions.

In the example described above, the emitter turned on the program means when column 1 of the card was read. The program means then performed two program steps, thereby setting the machine up for Program D, after which the program means turned on the card reading means to resume the reading of the card columns commencing with column 2. Many complex programs can be handled readily by the disclosed program means, the example presented above being merely a simple illustration of its utility.

*Program-controlled column skip; card-controlled column skip*

The control of column skipping from the emitter plugboard 151 has been explained. In a similar fashion, the skip clutch magnet 270 can be controlled from the program switch contacts, by appropriately wiring this magnet to the program switch hubs. It can also be wired to the "X" (No. 11) contact strip of the card contact plate assembly for control by card perforations. In the latter case, an "X" perforation will initiate a skip. Suitable interlocks must, of course, be provided to prevent skipping when the "X" perforation is accompanied by another perforation in the same card column, representing an alphabetic character.

MISCELLANEOUS FEATURES

The principal features of the machine have been described hereinabove. There are numerous other features, among which may be mentioned the following:

The brush control bail shaft 124 (Figs. 6 and 10) is connected at its upper end to a hub 400 (Figs. 4, 6 and 10) located above the upper frame plate 94. This hub supports a spring blade 401, and when the bail shaft 124 is rocked to latch the brushes in their reading position, this blade 401 moves over an upper edge of the emitter plugboard 151 (provided the board 151 is fully inserted). This locks the plugboard 151 in place and prevents it from being inadvertently withdrawn while the brushes are in reading position.

The hub 400 also carries a radially extending pin 402 which, by cam action, operates a stop lever 403. When the shaft 124 is rocked to place the brushes in their reading position, the lever 403 is released by the pin 402. If at this time the front hinged portion 90 of the card reading station is in its open position (Fig. 17), the lever 403 assumes a position wherein it will prevent the structure 90 from being swung into a completely closed position. If the front portion is already closed, the lever 403 holds it closed while the brushes are reading the card. When the brushes are tripped into their non-reading position, the locking blade 401 and the stop lever 403 respectively assume their non-locking positions.

To insure proper feeding of the cards from the hopper H, the pressure plate 69 should exert a certain amount of pressure upon the card pack. If the operator should touch the plate 69 while cards are being fed, the plate 69 may fail to exert the proper pressure. A safety device therefore is included in the machine to prevent faulty operation under these conditions. Referring to Figs. 4 and 5, a safety switch 405 (not shown in the circuit diagrams) is arranged to be actuated by a lever 406 in the pantograph assembly 70. At its upper end the lever 406 has a rounded cam edge 407 against which the pressure plate 69 normally does not bear, but if the plate 69 is tilted rearwardly (as would be the case if the plate 69 were manually pushed toward the rear of the hopper H) it bears against the edge 407 and swings the lever 406 to actuate the switch contacts 405. This will result in a control function suspending the normal card feed until the pressure plate 69 is released. Such action will occur regardless of the position at which the pressure plate 69 stands.

The automatic actuating lever 72 which periodically shifts the pressure plate 69 acts upon the lower end of the plate 69, hence does not cause the plate 69 to be tilted in a direction for operating the switch 405. Switch 405 therefore is affected only by manual actuation of the pressure plate 69.

SUMMARY

The advantages of the machine have been pointed out above and will now be reviewed briefly:

The hopper H will accommodate single cards or a card pack of any size within the capacity of the hopper H. The hopper is intermittently opened by automatic means to permit the insertion of a small quantity of cards from time to time. If a larger quantity of cards is to be inserted, the hopper may be opened manually. When the cards are ejected, they are stacked in the same order as they were inserted. The first or top card faces the operator in both instances. The cards are required to move through only a short distance, approximately equal to two card widths.

The reading of a card is performed by moving brushes which sweep lengthwise along the card. The fields of the card may be read in any desired order, and selected fields may be omitted from any reading. If only the upper portion of a card is to be read, the card is ejected promptly after the last column of this upper portion is read. If a card is being re-sensed over a particular field only, the brush carriage is returned immediately to the beginning of that field and is not required to return first to its initial or uppermost position. These measures eliminate loss of time where only a part of a card is being sensed. The re-sensing feature is important in that it permits varying the sequence in which the fields of a card are read and also enable any field of a card to be repeatedly read, if desired.

All parts of the card reading apparatus are conveniently accessible for servicing and test purposes. The emitter plugboard is readily removed and inserted, and it enables many plugging changes to be made without disturbing the main plugboard of the machine. The brush carriage mechanism is of simple, rugged construction and is easily operated for moving the brushes in and out and for being coupled to and uncoupled from the driving screw shaft. The tab bar is readily removable and replaceable for quick tab changes.

The program control means is a permanent part of the machine and can be plugged for a wide variety of programs. In conjunction with the emitter plugboard, it affords extreme flexibility of operations.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Analyzing apparatus for a machine controlled by a record sheet bearing columns of index points in which character-representing designations are selectively recorded, such apparatus comprising a worm shaft, a carriage mounted on said shaft for movement longitudinally thereof, record sensing elements mounted on said carriage for sensing the index points of a record column, means for holding a record sheet parallel to said worm shaft and in a position to be sensed a column at a time by said sensing elements, coupling means on said carriage for effecting a screw-threaded driving connection between said worm shaft and said carriage, driving means to rotate said shaft for driving said carriage longitudinally of said shaft by screw action and for causing said sensing elements to sense the record columns consecutively, means for disengaging said coupling means to interrupt said screw-threaded driving connection between said shaft and said carriage, and means for restoring said carriage to an initial position thereof when said driving connection is interrupted.

2. Analyzing apparatus for a machine controlled by a record sheet bearing columns of index points in which character-representing designations are selectively recorded, such apparatus comprising a worm shaft, a carriage mounted on said shaft for movement longitudinally thereof, record sensing elements mounted on said carriage for sensing the index points of a record column, means for holding a record sheet parallel to said worm shaft and in a position to be sensed a column at a time by said sensing elements, coupling means on said carriage for effecting a screw-threaded driving connection between said worm shaft and said carriage, driving means to rotate said shaft for driving said carriage longitudinally of said shaft by screw action and for causing said sensing elements to sense the record columns consecutively, means on said carriage for disengaging said coupling means to interrupt said screw-threaded driving connection between said shaft and said carriage, operating mechanism cooperable with said coupling means and with said disengaging means for alternately establishing and interrupting said driving connection, and means for restoring said carriage to an initial position thereof when said driving connection is interrupted.

3. Analyzing apparatus for a machine controlled by a record sheet bearing columns of index points in which character-representing designations are selectively recorded, such apparatus comprising a worm shaft, a carriage mounted on said shaft for movement longitudinally thereof, record sensing elements mounted on said carriage for sensing the index points of a record column, means for holding a record sheet parallel to said shaft and in a position to be sensed a column at a time by said sensing elements, coupling means mounted on said carriage including a worm wheel engaged with said worm shaft and also including operating means to prevent rotation of said worm wheel, thereby to establish a driving connection for enabling said carriage to be advanced by screw action along said shaft when said shaft is rotated, driving means to rotate said shaft for advancing said carriage and thereby causing said sensing elements to be swept over the record sheet, release means effective to disable said operating means for causing said worm wheel to become freely rotatable, whereby said carriage is able to move along said shaft in a direction opposite to that in which said carriage is advanced by screw action, and restoring means for retracting said carriage along said shaft to a predetermined position when said worm wheel is free to rotate.

4. Analyzing apparatus for a machine controlled by a record sheet bearing columns of index points in which character-representing designations are selectively recorded, such apparatus comprising a worm shaft, a carriage mounted on said shaft for movement longitudinally thereof, record sensing elements mounted on said carriage for sensing the index points of a record column, means for holding a record sheet parallel to said shaft and in a position to be sensed a column at a time by said sensing elements, coupling means mounted on said carriage including a worm wheel engaged with said worm shaft and also including an operating member movable into a position to block the rotation of said worm wheel, thereby to establish a driving connection for enabling said carriage to be advanced by screw action along said shaft when said shaft is rotated, a latch for holding said operating member in its blocking position, driving means to rotate said shaft for advancing said carriage and thereby causing said sensing elements to be swept over the record sheet, release means effective to trip said latch for releasing said operating member and causing said worm wheel to become freely rotatable, whereby said carriage is able to move along said shaft in a direction opposite to that in which said carriage is advanced by screw action, and restoring means for retracting said carriage along said shaft to a predetermined position when said worm wheel is free to rotate.

5. Analyzing apparatus for successively analyzing columnar index points in a record card, such apparatus comprising a worm shaft, driving means for rotating said shaft, a carriage mounted on said shaft for movement longitudinally thereof, card holding means for holding a record card in a position parallel to said shaft, operating mechanism on said carriage movable into a position for coupling said carriage to said worm shaft whereby said carriage is advanced along said shaft by screw action when said shaft is rotated, a latch on said carriage for holding said operating mechanism in its coupling position, sensing brushes on said carriage controlled by said operating mechanism and movable into a position for sensing the card held by said card holding means when said operating mechanism is in its coupling position, release means for tripping said latch at a predetermined point in the travel of said carriage and thereby causing said operating mechanism to be released from its coupling position, and restoring means for returning said carriage to a predetermined position when said carriage is uncoupled from said shaft.

6. Analyzing apparatus for successively analyzing columnar index points in a record card, such apparatus comprising a worm shaft, driving means for rotating said worm shaft, a carriage mounted on said shaft for movement longitudinally thereof, card holding means for holding a record card in a position parallel to said shaft, operating mechanism on said carriage movable into a position for coupling said carriage to said worm shaft whereby said carriage is advanced along said shaft by screw action when said shaft is rotated, a latch on said carriage for holding said operating mechanism in its coupling position, sensing brushes mounted on said carriage for sensing the index points of the card held by said card holding means as said carriage travels along said shaft, release means for tripping said latch at a predetermined point in the travel of said carriage and causing said operating mechanism to be released from its coupling position, restoring means for returning said carriage to a selected position, when said carriage is uncoupled from said shaft, and a bail engageable with said operating mechanism for moving said operating mechanism into its coupling position.

7. Analyzing apparatus for successively analyzing columnar index points in a record card, such apparatus comprising a worm shaft, driving means for rotating said worm shaft, a carriage mounted on said shaft for movement longitudinally thereof, card holding means for holding a record card in a position parallel to said shaft, operating mechanism on said carriage movable into a position for coupling said carriage to said worm shaft whereby said carriage is advanced along said shaft by screw action when said shaft is rotated, a latch on said carriage for holding said operating mechanism in its coupling position, sensing brushes on said carriage controlled by said operating mechanism and movable into a position for sensing the index points of the card held by said card holding means when said operating mechanism is in its coupling position, release means for tripping said latch at a predetermined point in the travel of said carriage and causing said operating mechanism to be released from its coupling position, restoring means for returning said carriage to a selected position when said carriage is uncoupled from said shaft, and a bail engageable with said operating mechanism for moving said operating mechanism into its coupling position when said carriage is in said selected position.

8. Analyzing apparatus for successively analyzing columnar index points in a record card, such apparatus comprising a worm shaft, driving means for rotating said worm shaft, a carriage mounted on said shaft for movement longitudinally thereof, card holding means for holding a record card in a position parallel to said shaft, operating mechanism on said carriage movable into a position for coupling said carriage to said worm shaft whereby said carriage is advanced along said shaft by screw action when said shaft is rotated, a latch on said carriage for holding said operating mechanism in its coupling position, sensing brushes mounted on said carriage for sensing the index points of said card held by said card holding means as said carriage travels along said shaft, release means on said carriage effective when operated to trip said latch and cause said operating mechanism to be released from its coupling position, a bail positioned along the path of said carriage and engageable with said release means for tripping said latch and thereby uncoupling said carriage from the shaft, and restoring means for returning said carriage to a selected position when said carriage is uncoupled from said shaft, said bail also being engageable with said operating mechanism on said carriage for again coupling said carriage to said shaft when said carriage is restored to said selected position.

9. Analyzing apparatus for successively analyzing columnar index points in a record card, such apparatus comprising a worm shaft, driving means for rotating said worm shaft, a carriage mounted on said shaft for movement longitudinally thereof, card holding means for holding a record card in a position parallel to said shaft, operating mechanism on said carriage movable into a position for coupling said carriage to said worm shaft whereby said carriage is advanced along said shaft by screw action when said shaft is rotated, a latch on said carriage for holding said operating mechanism in its coupling position, sensing brushes mounted on said carriage for sensing the index points of said card held by said card holding means as said carriage travels along said shaft, said brushes being controlled by said operating mechanism whereby said brushes are in position to sense the card only when said operating mechanism is in coupling position, release means on said carriage effective when operated to trip said latch and cause said operating mechanism to be released from its coupling position, a bail extending along the path of said carriage and engageable with said release means at any position of said carriage for tripping said latch to thereby uncouple said carriage from the shaft and move said brushes out of sensing position, and restoring means for returning said carriage to a selected position when said carriage is uncoupled from said shaft, said bail also being engageable with said operating mechanism on said carriage for again coupling said carriage to said shaft and restoring said brushes to their sensing position.

10. Analyzing apparatus for a machine controlled by a record having a plurality of columns, each column bearing a plurality of index points for the recording of data designations therein, such apparatus comprising a column emitter having a series of contacts respectively corresponding to the various columns of said record, means for holding said record in a position for having the columns thereof analyzed consecutively, a carriage having a set of analyzing brushes for cooperating successively with the columns of said record and a second set of brushes for cooperating successively with the contacts of said emitter, individual manifestation devices respectively corresponding to the index points of a card column and cooperating with said analyzing brushes to manifest the data represented on said record as said data designations are sensed by said analyzing brushes, and function means cooperating with said column emitter and said second set of brushes for effecting a functional operation of said apparatus when a selected record column is sensed.

11. Analyzing apparatus for successively analyzing columnar index points in a record card, such apparatus comprising a worm shaft, driving means for rotating said worm shaft, a carriage mounted on said shaft for movement longitudinally thereof, card holding means for holding a record card in a position parallel to said shaft, an operating mechanism on said carriage movable into a position for coupling said carriage to said worm shaft whereby said carriage is advanced along said shaft by screw action when said shaft is rotated, a latch on said carriage for holding said operating mechanism in its coupling position, a set of reading brushes mounted on said carriage for sensing the index points of a card column and for sensing the card columns successively as said carriage is advanced along said shaft, a column emitter having a series of contacts respectively corresponding to the various columns of said card and extending parallel to said worm shaft, a second set of brushes on said carriage for cooperating successively with said emitter contacts as the card columns are successively sensed, trip means for actuating said latch to release said operating mechanism and thereby uncouple said carriage from said worm shaft when said carriage attains a selected columnar position, restoring means for returning said carriage to an initial position when said operating mechanism is released, said reading brushes and said second brushes being controlled by said operating mechanism so as to move out of their cooperative relationships with said card and said emitter when said operating mechanism is released, data manifestation devices controlled by said reading brushes for manifesting the data sensed thereby, and function means cooperating with said column emitter and said second brushes for effecting a functional operation of said apparatus when a selected record column is sensed.

12. Apparatus as set forth in claim 11, wherein said function means controls said trip means for automatically releasing said carriage at a predetermined card column.

13. Analyzing apparatus for a machine controlled by a record card bearing a plurality of columns of index points in which data-representing designations are recorded, such apparatus comprising means for holding a record card in a position to be analyzed, a brush carriage moving along a path paralleling the card and in transverse relationship to the columns thereof, card sensing brushes mounted on said carriage and cooperating with said card, first driving means for moving said brush carriage continuously at a given speed while said brushes are sensing said card, second driving means for moving said brush carriage continuously at a higher speed while said brushes are being skipped over predetermined card columns, and column selecting means for rendering said first and second driving means operative selectively in accordance with the columnar position of said carriage.

14. In a record analyzing apparatus including a set of analyzing brushes movable relative to a stationary record, the combination of a rotatable worm shaft, a brush carriage mounted on said shaft, said carriage including a frame embracing said shaft and slidable therealong, a worm wheel rotatably mounted on said frame and engaging the thread of said worm shaft, a ratchet rotatably mounted on said frame and connected to said wheel for rotation therewith, and a pawl on said frame movable into engagement with said ratchet to arrest the rotation of said worm wheel, thereby causing said carriage to be advanced along said worm shaft by screw action as said shaft rotates, and operating means for actuating said pawl into and out of its rotation-arresting position.

15. Analyzing apparatus for a machine controlled by a record card bearing a plurality of columns of index points in which data-representing designations are recorded, such apparatus comprising a worm shaft, means for holding a record card parallel to said worm shaft, with the columns of said card being in transverse relationship to said shaft, a brush carriage mounted on said shaft for movement longitudinally thereof, card sensing brushes mounted on said carriage for cooperating successively with the card columns as said carriage moves along said shaft, first driving means for rotating said shaft at a given speed to move said brushes along said card at a normal reading speed, second driving means for rotating said shaft at a higher speed to move said brush carriage at a skipping speed, and selecting means for determining the respective operations of said first driving means and said second driving means.

16. Analyzing apparatus for a machine controlled by a record card bearing a plurality of columns of index points in which data-representing designations are recorded, such apparatus comprising a worm shaft, means for holding a record card parallel to said worm shaft, with the columns of said card being in transverse relationship to said shaft, a brush carriage mounted on said shaft for movement longitudinally thereof, card sensing brushes mounted on said carriage for cooperating successively with the card columns as said carriage moves along said shaft, first driving means for rotating said shaft at a given speed to move said brushes along said card at a normal reading speed, second driving means for rotating said shaft at a higher speed to move said brush carriage at a skipping speed, and selecting means controlled in part by said carriage for causing said first driving means and said second driving means to operate alternatively in accordance with the columnar-position of said carriage, said selecting means including a portion settable to determine the columns at which changeovers from one driving means to another are made.

17. Analyzing apparatus for a machine controlled by a record card bearing a plurality of columns of index points in which data-representing designations are recorded, such apparatus comprising a worm shaft, means for holding a record card parallel to said worm shaft, with the columns of said card being in transverse relationship to said shaft, a brush carriage mounted on said shaft for movement longitudinally thereof, card sensing brushes mounted on said carriage for cooperating successively with the card columns as said carriage moves along said shaft, an emitter having a series of columnar contacts arranged parallel to said shaft, second brush means on said carriage for cooperating successively with the emitter contacts as said carriage moves along said shaft, first driving means for rotating said shaft at a given speed for moving said brushes along said card at a normal reading speed, second driving means for rotating said shaft at a higher speed to move said brush carriage at a skipping speed, and selecting means controlled by said emitter for determining the respective operations of said first driving means and said second driving means according to the columnar position of said second brush means on said emitter contacts.

18. In a device for reading a record card having columns of index points in which data designations are recorded, the combination of sensing elements for sensing the index points of a card column, a carriage supporting said sensing elements and movable along the card, means for driving said carriage in one direction to bring said sensing elements into cooperation with the card columns consecutively, means to release said carriage from said driving means, yieldable restoring means for returning said carriage in the opposite direction when said carriage is released, a tab bar positioned near the path of said carriage, said tab bar being movable into a plurality of angular positions, a tab stop on said tab bar, a stop arm on said carriage, said tab stop being in the return path of said carriage stop arm when said tab bar is in one position and being clear of such return path when said tab bar is in another of its positions, tab selecting means for determining the angular position of said tab bar to determine the position to which said carriage is returned, and coupling means for coupling said carriage to said driving means.

19. In a device for reading a record card having columns of index points in which data designations are recorded, the combination of sensing elements for sensing the index points of a card column, a carriage supporting said sensing elements and movable along the card for bringing said sensing elements into cooperation with the card columns successively, means for driving said carriage in one direction, means to release said carriage from said driving means, yieldable restoring means for returning said carriage in the opposite direction toward a predetermined initial position, a tab bar positioned near the path of said carriage, said tab bar being movable into a plurality of angular positions, a plurality of tab stops on said tab bar, a stop arm on said carriage, each of said tab stops being in the return path of said carriage stop arm when said tab bar is in a particular one of its angular positions and being clear of such return path when said tab bar is in its other angular positions, said tab stops being arranged on said tab bar at selected points to arrest said carriage at selected intermediate positions, and means for intermittently varying the angular position of said tab bar to render different ones of said tab stops effective for arresting said carriage.

20. In a device for reading a record card having columns of index points in which data designations are recorded, the combination of sensing elements for sensing the index points of a column, a carriage supporting said sensing elements and movable along the card, means for driving said carriage in one direction, means to release said carriage from said driving means, yieldable restoring means for returning said carriage in the opposite direction after release thereof, means supporting said tab bar for angular movement about an axis parallel to said tab bar and also permitting said tab bar to shift longitudinally, tab stop means on said tab bar, a stop member on said carriage, said tab stop means being in the return path of said carriage stop member when said tab bar is in one of its angular positions and being clear of such return path when said tab bar is in a different angular position, whereby said carriage is arrested at an intermediate position under one condition and is returned to an initial position under another condition, said tab bar being shifted longitudinally when said stop member encounters said tab stop means, means normally effective to couple said carriage to said driving means at predetermined times, and control means responsive to longitudinal movement of said tab bar to prevent the operation of said coupling means if said tab bar is not shifted longitudinally prior to a time when said carriage normally would be coupled to said shaft.

21. The apparatus set forth in claim 20, including means positioned in the path of said carriage stop arm at the initial position of said carriage for actuating said control means as though in response to the longitudinal shifting of said tab bar, when said carriage is returned to said initial position.

22. Apparatus for reading a record card having columns of index points in which data designations are recorded, comprising a worm shaft, means supporting a record card parallel to said worm shaft, with the columns of said card extending transversely with respect to said shaft, a carriage mounted on said shaft for movement longitudinally thereof, means on said carriage operable to couple said carriage to said shaft for causing said carriage to be driven along said shaft by screw action when said shaft is rotated, release means operable to uncouple said carriage from said shaft, yieldable restoring means for returning said carriage toward an initial position thereof when said carriage is uncoupled from said shaft, card sensing means supported by said carriage for sensing the columns of said card successively when said carriage is being driven by said shaft, means for actuating said release means at a predetermined point in the travel of said carriage, stop means for arresting said carriage during its return travel, and means for operating said coupling means at predetermined intervals for coupling said carriage to said shaft, said stop means having an actuating mechanism operable through a cycle of steps each occurring prior to the time that said periodically functioning means becomes effective, thereby determining the position which said carriage occupies when the same is coupled to said shaft.

23. In a device for reading a record card having columns of index points in which data designations are recorded, the combination of sensing elements for sensing the index points of a column, a carriage supporting said sensing elements and movable along the card, means for driving said carriage in one direction for bringing said sensing elements into cooperation with successive card columns, means to release said carriage from said driving means, yieldable restoring means for returning said carriage in the opposite direction after release thereof, tab stop means movable into and out of the return path of said carriage for arresting said carriage at an intermediate position when a selected field of the card is to be re-sensed and for permitting said carriage to return to said initial position when the card is not to be re-sensed, and tab stop operating means controlled by said sensing elements for operating said tab stop means selectively in response to a special designation in the card.

24. In combination with the apparatus set forth in claim 23, a control circuit operable in response to the sensing of another special designation by said sensing elements for effecting the operation of said release means when said selected card field is re-sensed.

25. Apparatus for feeding record cards comprising two sets of feed rollers having their centers spaced apart along the card path in an amount greater than the distance between the leading and trailing edges of the card, first and second registering fingers respectively engageable with the leading and trailing edges of the card for holding the card in a stationary reading position between said sets of feed rollers, means for moving said registering fingers in the direction of card movement whereby said second registering finger pushes the card into the bite of the leading feed rollers, and means for retracting said registering fingers in a direction opposite to the card movement beyond the initial positions of said fingers and for thereafter restoring said fingers to their initial positions to move a subsequent card into said reading position between said sets of feed rollers.

26. A card ejecting mechanism for a record card feeding and analyzing apparatus, such mechanism comprising a card receptacle, a pair of cooperating feed rollers for feeding a card into said receptacle, yieldable clamping means in said receptacle for frictionally holding the card in an intermediate position as it leaves the bite of said feed rollers and before the card fully enters said receptacle, and a reciprocatory finger engageable with the trailing edge of said card while the card is gripped by said clamping means to push the card fully into said receptacle.

27. Apparatus for feeding record cards in a record card-controlled machine, such apparatus comprising two sets of feed rollers having their centers spaced apart along the card path in an amount greater than the distance between the leading and trailing edges of a card, first and second registering fingers respectively engageable with the leading and trailing edges of a card for holding the card in a stationary reading position between said sets of feed rollers, means for moving said registering fingers in the direction of card movement whereby said second registering finger pushes the card from said reading position into the bite of the leading feed rollers, yieldable gripping means for holding the card as it leaves the bite of said leading feed rollers, means for retracting said registering fingers in a direction opposite to the card movement beyond the initial positions of said fingers and for thereafter restoring said fingers to their initial positions for moving a subsequent card into said reading position between said sets of feed rollers, and a card receptacle, said first registering finger being engageable with the trailing edge of the card held by said gripping means to push said card into said receptacle.

28. In a device for feeding record cards successively, a card hopper for supporting record cards on edge and having a lateral exit throat, a reciprocatory card picker for intermittently feeding cards laterally from said hopper through said throat, card feeding rollers outside of said hopper at said exit throat, and a reciprocatory shutter operated by said card picker for intermittently closing said throat after each card has left the hopper, thereby to prevent the entry of other cards from said hopper into said feed rollers.

29. In a device for feeding record cards successively, a card hopper for supporting a stack of record cards on edge, a reciprocatory card picker for intermittently feeding cards from said hopper, a pressure plate assembly for urging the stack of cards toward said picker, said assembly including a pressure plate supported by pantograph means yieldingly retaining said plate in a position parallel to the cards irrespective of the size of the stack, said plate being pivotally mounted on said pantograph means for tilting movement away from said parallel position when manually forced away from the stack, and switch means operable in response to such tilting movement of said plate for effecting a control operation to prevent the feeding of cards from said hopper until said plate is free to assume its normal position.

30. Analyzing apparatus for succesively analyzing columnar index points in a record card, such apparatus comprising a worm shaft, driving means for rotating said worm shaft, a carriage mounted on said shaft for movement longitudinally thereof, card holding means for holding a record card in a position parallel to said shaft, operating mechanism on said carriage movable into a position for coupling said carriage to said worm shaft whereby said carriage is advanced along said shaft by screw action when said shaft is rotated, a latch on said carriage for holding said operating mechanism in its coupling position, card sensing brushes mounted on said carriage for sensing the index points of the card held by said holding means as said carriage travels along said shaft, a column emitter having a series of column-representing contacts extending parallel to said worm shaft, emitter brushes mounted on said carriage for sensing said contacts successively as the card columns are sensed, said emitter being removable from said apparatus, release means on said carriage effective when operated to trip said latch and cause said operating mechanism to be released from its coupling position, an oscillatory bail shaft extending parallel to said worm shaft, a bail mounted on said shaft for alternately engaging said release means and said operating mechanism on said carriage, and means actuated by said bail shaft for locking said emitter against removal from said apparatus while said carriage is coupled to said worm shaft.

31. Analyzing apparatus for successively analyzing columnar index points in a record card, such apparatus comprising a worm shaft, driving means for rotating said worm shaft, a carriage mounted on said shaft for movement longitudinally thereof, card holding means normally adapted to hold a record card in a position close to said worm shaft, said card holding means also being movable away from said worm shaft, operating mechanism on said carriage movable into a position for coupling said carriage to said worm shaft whereby said carriage is advanced along said shaft by screw action when said shaft is rotated, a latch on said carriage for holding said operating mechanism in its coupling position, card sensing brushes mounted on said carriage for sensing the index points of the card held by said holding means as said carriage travels along said shaft, release means on said carriage effective when operated to trip said latch and cause said operating mechanism to be released from its coupling position, an oscillatory bail shaft extending parallel to said worm shaft, a bail mounted on said shaft for alternately engaging said release means and said operating mechanism on said carriage, and locking means for said card holding means operated by said bail shaft.

32. Apparatus for manifesting data under the control of a record card bearing columns of data designations, comprising card reading means normally effective to read the columns of a record card in succession, data manifesting means controlled by said card reading means for manifesting the data corresponding to the designations read in the card columns, program means operable to perform a variable number of program step actions in a given sequence, said program means normally being inactive when reading of the card columns is in progress, program step selecting means for conditioning said program means to perform a selected number of program step actions in a continuous sequence, card read stop and program start means effective when a selected card column is read to interrupt the operation of said card reading means and initiate the operation of said program means, a plurality of functional devices each effective when operated to perform a given function of said apparatus, said functional devices being adapted to operate in sequence under the control of said program means as the program step actions are successively performed, and restoring means operable as an incident to the final program step action in the sequence for restoring said card reading means to its operating condition.

33. Apparatus for manifesting data under the control of a record card bearing columns of data designations, comprising card reading means normally effective to read the columns of a record card in succession, data manifesting means controlled by said card reading means for manifesting the data corresponding to the designations read in the card columns, program means operable to perform a variable number of program step actions in a given sequence, program step selecting means for conditioning said program means to perform a selected number of program step actions in a continuous sequence, program start means controlled by said card reading means and effective when a selected card column is read to initiate the operation of said program means, control means for causing said card reading means to cease operation when said program means commences to operate and for restoring said card reading means to operation when the last of said program step actions is performed, and a plurality of functional devices each effective when operated to perform a given function of said apparatus, said functional devices being adapted to operate in sequence under the control of said program means as the program step actions are successively performed.

34. Apparatus for manifesting data under the control of a record card bearing columns of data designations, comprising card reading means normally effective to read the columns of a record card in succession, data manifesting means controlled by said card reading means for manifesting the data corresponding to the designations read in the card columns, a column emitter operable concurrently with said card reading means and having a series of plughubs which are activated in sequence as the reading of the card columns progresses, program means adapted to operate in a sequence of program step actions and having a series of pluggable terminals which are respectively activated at the different program steps, said program means normally being inactive when the card columns are being read, card read stop and program start means operable to interrupt the reading of the card columns and initiate the operation of said program means, plug connector means operatively connecting said card read stop and program start means to a selected one of said emitter plughubs for causing the program to start when the reading of the card columns has progressed to a selected point, a plurality of functional devices respectively adapted to perform various functions of said apparatus, plug connectors operatively connecting said functional devices respectively to said pluggable terminals whereby said devices are operated in sequence as said program means goes through its sequence of program step actions, restoring means operable to terminate the operation of said program means and restore said card reading means to its operating condition, and connector means for operatively connecting said restoring means to a selected one of said pluggable terminals to terminate the program when a selected number of program step actions is performed.

35. Apparatus for manifesting data under the control of a record card bearing columns of data designations, comprising card reading means normally effective to read the columns of a record card in succession, data manifesting means controlled by said card reading means for manifesting the data corresponding to the designations read in the card columns, a column emitter operable concurrently with said card reading means and having a series of terminals which are activated in sequence as the reading of the card columns progresses, program means adapted to operate in a sequence of program step actions, said program means including a stepping switch and a series of contact devices adapted to be progressively activated by said switch when said program means is operating, means operatively connecting said stepping switch to a selected one of said emitter terminals for initiating the operation of said stepping switch when the reading of the card columns has progressed to a selected point, control means for causing said card reading means to cease operations when said program means commences to operate, a plurality of functional devices respectively adapted to perform various functions of said apparatus, means operatively connecting said functional devices respectively to said contact devices whereby said functional devices are operated in sequence as said contact devices are progressively activated by said program means, restoring means operable to terminate the operation of said program means and restore said card reading means to its operating condition, and means operatively connecting said restoring means to a selected one of said contact devices for terminating the program operation when a selected number of steps has been performed by said switch.

36. Apparatus for manifesting data under the control of a record card bearing columns of data designations, comprising means for holding the record card in a reading position, a reading brush unit movable lengthwise of the card for successively reading the columns of data designations, a column emitter operating concurrently with said brush unit, data manifesting means adapted to be controlled by said brush unit for manifesting the data read from the card, program means normally inactive when said brush unit is reading data from the card, said program means including a stepping switch having switch contacts adapted to be activated progressively when said switch advances, program "on" means operable to initiate the operation of said stepping switch and suspend the operation of said reading brush unit, said column emitter controlling said program "on" means to initiate the operation thereof at a selected card column, functional devices each effective when operated to perform a given function of said apparatus, connecting devices for connecting said functional devices selectively to said program switch contacts and to said column emitter, whereby functions of said apparatus are performed alternatively under the control of said column emitter and said program means, program "off" means effective when operated to interrupt the operation of said stepping switch and restore the operation of said reading brush unit, and means operatively connecting said program "off" means to a selected one of said program switch contacts for terminating the operation of said program means when a selected number of program steps have been performed.

HANS PETER LUHN.

REFERENCES CITED

The following references are of record in the file of this patent:

UNITED STATES PATENTS

| Number | Name | Date |
| --- | --- | --- |
| 1,895,073 | Fenton | Jan. 24, 1933 |
| 2,079,429 | Tauschek | May 4, 1937 |
| 2,434,512 | Page et al. | Jan. 13, 1948 |
| 2,448,830 | Robbins et al. | Sept. 7, 1948 |
| 2,464,569 | Ford | Mar. 15, 1949 |
| 2,508,603 | Gollwitzer | May 23, 1950 |
| 2,510,559 | Daly | June 6, 1950 |
| 2,514,031 | Daly | July 4, 1950 |